(12) United States Patent
Imada

(10) Patent No.: US 10,876,458 B2
(45) Date of Patent: *Dec. 29, 2020

(54) MICROWAVE IRRADIATION DEVICE, EXHAUST PURIFICATION APPARATUS, AUTOMOBILE AND MANAGEMENT SYSTEM

(71) Applicant: FUJITSU LIMITED, Kawasaki (JP)

(72) Inventor: Tadahiro Imada, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 302 days.

This patent is subject to a terminal disclaimer.

(21) Appl. No.: 15/914,658

(22) Filed: Mar. 7, 2018

(65) Prior Publication Data

US 2018/0258820 A1 Sep. 13, 2018

(30) Foreign Application Priority Data

Mar. 10, 2017 (JP) ................. 2017-046739

(51) Int. Cl.
*F01N 9/00* (2006.01)
*B01D 46/24* (2006.01)
(Continued)

(52) U.S. Cl.
CPC ............ *F01N 9/002* (2013.01); *B01D 41/04* (2013.01); *B01D 46/0063* (2013.01);
(Continued)

(58) Field of Classification Search
CPC combination set(s) only.
See application file for complete search history.

(56) References Cited

U.S. PATENT DOCUMENTS 4,934,141 A 6/1990 Ollivon et al.
6,166,364 A 12/2000 Ha
(Continued)

FOREIGN PATENT DOCUMENTS

JP 57-67398 U 4/1982
JP H04-179817 6/1992
(Continued)

OTHER PUBLICATIONS

USPTO—TRAN—Notice of Allowance dated Mar. 12, 2019 for U.S. Appl. No. 15/364,224 [issued].
(Continued)

*Primary Examiner* — Binh Q Tran
(74) *Attorney, Agent, or Firm* — Fujitsu Patent Center

(57) ABSTRACT

A microwave irradiation device includes a housing capable of accommodating an object to be heated; a plurality of microwave resonators installed around the housing; a microwave conductor coupling the plurality of microwave resonators; a microwave generator configured to generate microwaves having different frequencies; and a microwave measurement circuit coupled to the housing or the microwave conduction unit. Each of the microwave resonators resonates a microwave having a resonance frequency of the microwave resonator generated in the microwave generator and irradiates the object placed in the housing with the resonated microwave, and one microwave resonator among the plurality of microwave resonators and another microwave resonator have different resonance frequencies.

12 Claims, 30 Drawing Sheets

(51) Int. Cl.
  *B01D 46/00* (2006.01)
  *B01D 46/44* (2006.01)
  *H05B 6/10* (2006.01)
  *F01N 3/10* (2006.01)
  *B01D 41/04* (2006.01)
  *F01N 3/021* (2006.01)
  *F01N 3/035* (2006.01)
  *F01N 3/20* (2006.01)
  *H05B 6/70* (2006.01)
  *F01N 3/028* (2006.01)

(52) U.S. Cl.
  CPC ....... *B01D 46/2418* (2013.01); *B01D 46/448* (2013.01); *F01N 3/021* (2013.01); *F01N 3/035* (2013.01); *F01N 3/106* (2013.01); *F01N 3/206* (2013.01); *H05B 6/10* (2013.01); *H05B 6/707* (2013.01); *B01D 2273/22* (2013.01); *B01D 2279/30* (2013.01); *F01N 3/028* (2013.01); *F01N 2510/06* (2013.01); *F01N 2610/04* (2013.01); *F01N 2900/0601* (2013.01); *F01N 2900/08* (2013.01); *F01N 2900/102* (2013.01); *F01N 2900/12* (2013.01); *F01N 2900/1402* (2013.01); *F01N 2900/1602* (2013.01); *F01N 2900/1606* (2013.01); *Y02T 10/40* (2013.01)

(56) References Cited

U.S. PATENT DOCUMENTS

| | | | |
|---|---|---|---|
| 7,138,615 | B1 | 11/2006 | Williamson et al. |
| 7,158,644 | B2 * | 1/2007 | Kakuhari ............ G10K 11/178 381/71.5 |
| 7,303,603 | B2 | 12/2007 | Gregoire et al. |
| 7,475,533 | B2 | 1/2009 | Hirata et al. |
| 7,931,727 | B2 * | 4/2011 | Gonze ................... F01N 3/028 55/282.3 |
| 10,301,989 | B2 * | 5/2019 | Imada ................... F01N 3/028 |
| 10,577,992 | B2 * | 3/2020 | Imada ..................... H05B 6/80 |
| 2011/0017706 | A1 | 1/2011 | Takahashi et al. |
| 2011/0108548 | A1 * | 5/2011 | Nobue ................. H05B 6/6402 219/702 |
| 2012/0103975 | A1 | 5/2012 | Okajima |
| 2020/0053843 | A1 * | 2/2020 | Otsuki ................. H05B 6/645 |

FOREIGN PATENT DOCUMENTS

| | | |
|---|---|---|
| JP | 5-326133 | 12/1993 |
| JP | 10-220219 | 8/1998 |
| JP | 2001-052851 | 2/2001 |
| JP | 2002-070530 | 3/2002 |
| JP | 2006-140063 | 6/2006 |
| JP | 2009-215926 | 9/2009 |
| JP | 2012-507660 | 3/2012 |
| JP | 4995351 | 8/2012 |
| WO | 2010/074812 | 7/2010 |
| WO | 2011/070721 | 6/2011 |

OTHER PUBLICATIONS

USPTO—TRAN—Final Rejection dated Nov. 1, 2018 for U.S. Appl. No. 15/364,224 [issued].

USPTO—TRAN—Non-Final Rejection dated Apr. 20, 2018 for U.S. Appl. No. 15/364,224 [issued].

JPOA—Office Action of Japanese Patent Application No. 2017-046739 dated Oct. 6, 2020 with Full Machine Translation. * References Nos. 4-5 cited in the JPOA were submitted in the IDS filed on Jun. 16, 2020, and Mar. 7, 2018, respectively.

* cited by examiner

FIG. 11

| TEM-PERATURE \ OUTPUT VOLTAGE | 0~0.5V | 0.5~1V | 1~1.5V | 1.5~2V | 2~2.5V | 2.5~3V | 3~3.5V | 3.5~4V | 4~4.5V | 4.5~5V |
|---|---|---|---|---|---|---|---|---|---|---|
| ~50°C | END OF RE-GENERATION | | | | | | | FORCED RE-GENERATION | FORCED RE-GENERATION | FORCED RE-GENERATION |
| 50~100°C | END OF RE-GENERATION | | | | | | | FORCED RE-GENERATION | FORCED RE-GENERATION | FORCED RE-GENERATION |
| 100~150°C | END OF RE-GENERATION | | | | | | | FORCED RE-GENERATION | FORCED RE-GENERATION | FORCED RE-GENERATION |
| 150~200°C | END OF RE-GENERATION | | | | | | | FORCED RE-GENERATION | FORCED RE-GENERATION | FORCED RE-GENERATION |
| 200~250°C | END OF RE-GENERATION | END OF RE-GENERATION | | | | | | FORCED RE-GENERATION | FORCED RE-GENERATION | FORCED RE-GENERATION |
| 250~300°C | END OF RE-GENERATION | END OF RE-GENERATION | | | | | | FORCED RE-GENERATION | FORCED RE-GENERATION | FORCED RE-GENERATION |
| 300~350°C | END OF RE-GENERATION | END OF RE-GENERATION | END OF RE-GENERATION | | | | | | FORCED RE-GENERATION | FORCED RE-GENERATION |
| 350~400°C | END OF RE-GENERATION | END OF RE-GENERATION | END OF RE-GENERATION | | | | | | FORCED RE-GENERATION | FORCED RE-GENERATION |
| 400~450°C | END OF RE-GENERATION | END OF RE-GENERATION | END OF RE-GENERATION | | | | | | FORCED RE-GENERATION | FORCED RE-GENERATION |
| 450~500°C | END OF RE-GENERATION | END OF RE-GENERATION | END OF RE-GENERATION | END OF RE-GENERATION | | | | | FORCED RE-GENERATION | FORCED RE-GENERATION |
| 500~550°C | END OF RE-GENERATION | END OF RE-GENERATION | END OF RE-GENERATION | END OF RE-GENERATION | | | | | | FORCED RE-GENERATION |
| 550~600°C | END OF RE-GENERATION | END OF RE-GENERATION | END OF RE-GENERATION | END OF RE-GENERATION | | | | | FORCED RE-GENERATION | FORCED RE-GENERATION |
| 600°C~ | END OF RE-GENERATION | END OF RE-GENERATION | END OF RE-GENERATION | END OF RE-GENERATION | | | | | FORCED RE-GENERATION | FORCED RE-GENERATION |

FIG. 19

| DRIVER ID | DRIVING PATTERN ~210 | | |
|---|---|---|---|
| | STRAIGHT LINE | GENTLE CURVE | STEEP CURVE |
| 1 | 0.9 | 1.2 | 0.8 |
| 2 | 1.5 | 1.4 | 1.1 |

FIG. 20

| VEHICLE ID | EASINESS OF PM DEPOSITION ~220 |
|---|---|
| 100 | 1.5 |
| 101 | 0.7 |

FIG. 21

| SHIPMENT ID | WEIGHT [kg] | EASINESS OF PM DEPOSITION |
|---|---|---|
| 10 | 50 | 1.5 |
| 11 | 70 | 1.7 |
| 12 | 30 | 1.3 |

| SECTION | EASINESS OF PM DEPOSITION | | |
|---|---|---|---|
| | NO CONGESTION | LIGHT CONGESTION | HEAVY CONGESTION |
| P1, P2 | 1 | 1.1 | 1.3 |
| P2, P3 | 1 | 1.3 | 1.7 |

| SECTION | REFERENCE DEPOSITION AMOUNT |
|---------|------------------------------|
| P1, P2  | ○○                           |
| P2, P3  | ××                           |

~250

MICROWAVE IRRADIATION DEVICE, EXHAUST PURIFICATION APPARATUS, AUTOMOBILE AND MANAGEMENT SYSTEM

CROSS-REFERENCE TO RELATED APPLICATION

This application is based upon and claims the benefit of priority of the prior Japanese Patent Application No. 2017-046739, filed on Mar. 10, 2017, the entire contents of which are incorporated herein by reference.

FIELD

The embodiments discussed herein are related to a microwave irradiation device, an exhaust purification apparatus, an automobile and a management system.

BACKGROUND

An exhaust purification apparatus using a diesel particulate filter (DPF) has been practically used as a device for collecting fine particles such as particulate matter (PM) contained in an exhaust gas. In this exhaust purification apparatus, since fine particles such as the PM are deposited on the DPF as the device is used, it is required to regenerate the DPF. As a method of regenerating the DPF, there has been disclosed a method using a high frequency electromagnetic wave such as a microwave emitted from a microwave irradiation device. Specifically, this method regenerates the DPF by irradiating an electromagnetic wave such as a microwave to the DPF so as to heat and burn the fine particles such as the PM deposited on the DPF.

Related techniques are disclosed in, for example, Japanese Laid-Open Patent Publication No. 10-220219 and Japanese Patent No. 5628818.

SUMMARY

According to an aspect of the embodiments, a microwave irradiation device is provided including: a housing in which an object to be heated is placed; a plurality of microwave resonators installed around the housing; a microwave conductor coupling the plurality of microwave resonators; a microwave generator configured to generate microwaves having different frequencies; and a microwave measurement circuit coupled to the housing or the microwave conductor. Each of the microwave resonators resonates a microwave having a resonance frequency of the microwave resonator generated in the microwave generator and irradiates the object placed in the housing with the resonated microwave, and one microwave resonator among the plurality of microwave resonators and another microwave resonator have different resonance frequencies.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 11 is an explanatory view of a table used for a control method 2 of the exhaust purification apparatus;

FIG. 19 is a view illustrating an example of a driving pattern database;

FIG. 20 is a view illustrating an example of a vehicle database;

FIG. 21 is a view illustrating an example of a shipment database;

FIG. 22 is a view illustrating an example of a congestion database;

FIG. 23 is a view illustrating an example of a reference deposition amount database;

DESCRIPTION OF EMBODIMENTS

Figure 1A:
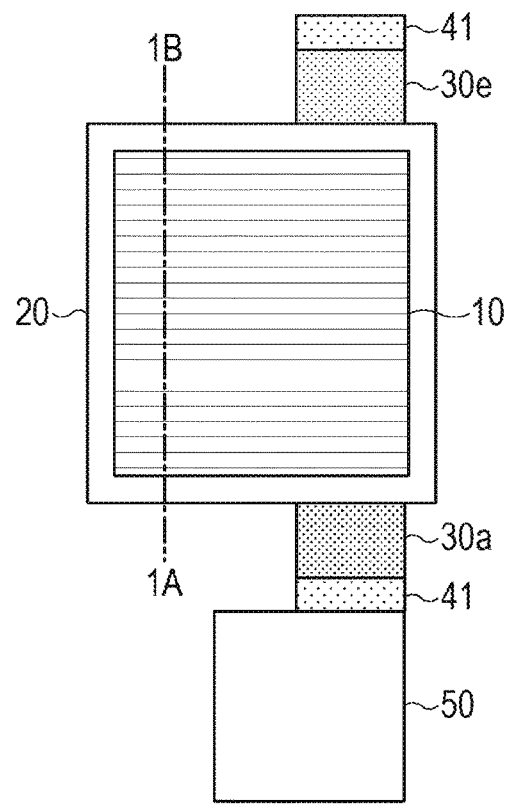
FIGS. 1A and 1B are explanatory views of a structure of a microwave irradiation device according to a first embodiment.

In the exhaust purification apparatus as described above, the DPF is regenerated by irradiating an electromagnetic wave such as a microwave to the DPF, so that the fine particles such as the PM are dielectrically heated, oxidized, and decomposed. Therefore, when a predetermined amount of fine particles such as the PM is deposited in the DPF, it is efficient to regenerate the DPF. However, the fine particles such as the PM deposited in the DPF cannot be seen from the outside of the DPF, and it is difficult to grasp an exact amount of the deposited fine particles such as PM.

Therefore, there is a need for a microwave irradiation device capable of accurately measuring the amount of fine particles such as PM deposited in a DPF.

Hereinafter, embodiments will be described. For example, identical members will be denoted by the same reference numeral, and overlapping descriptions thereof will be omitted.

First Embodiment

Figure 1B:
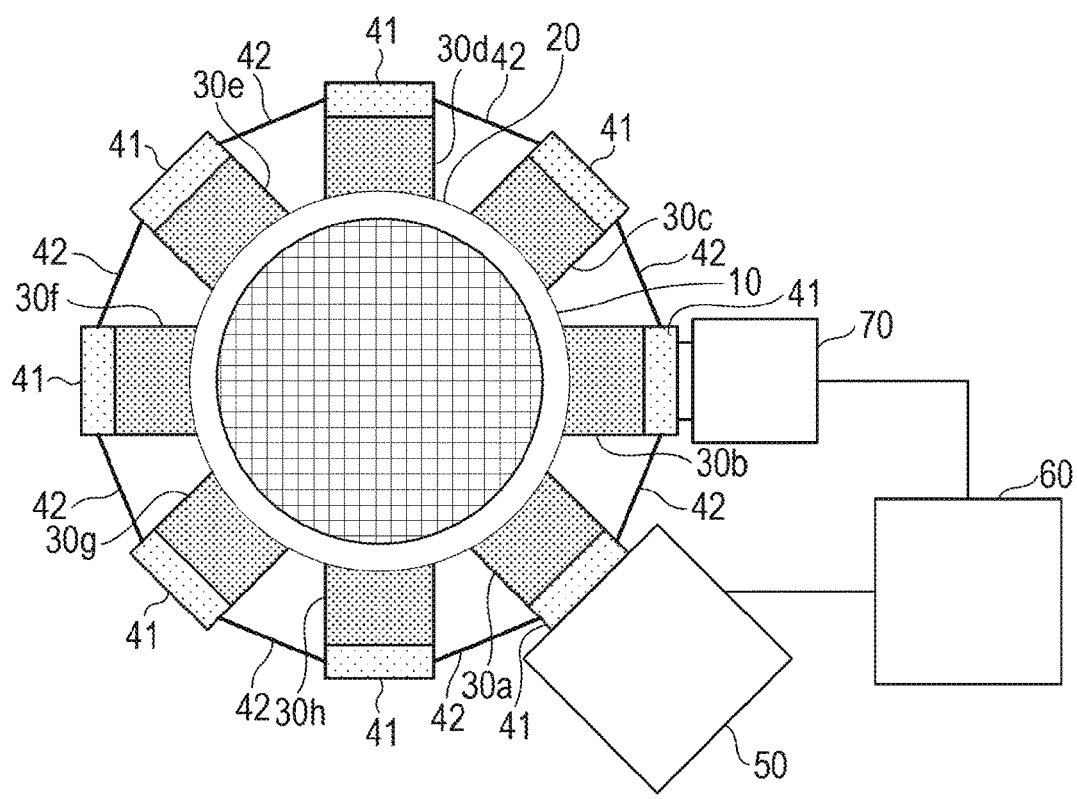
Figure 2:
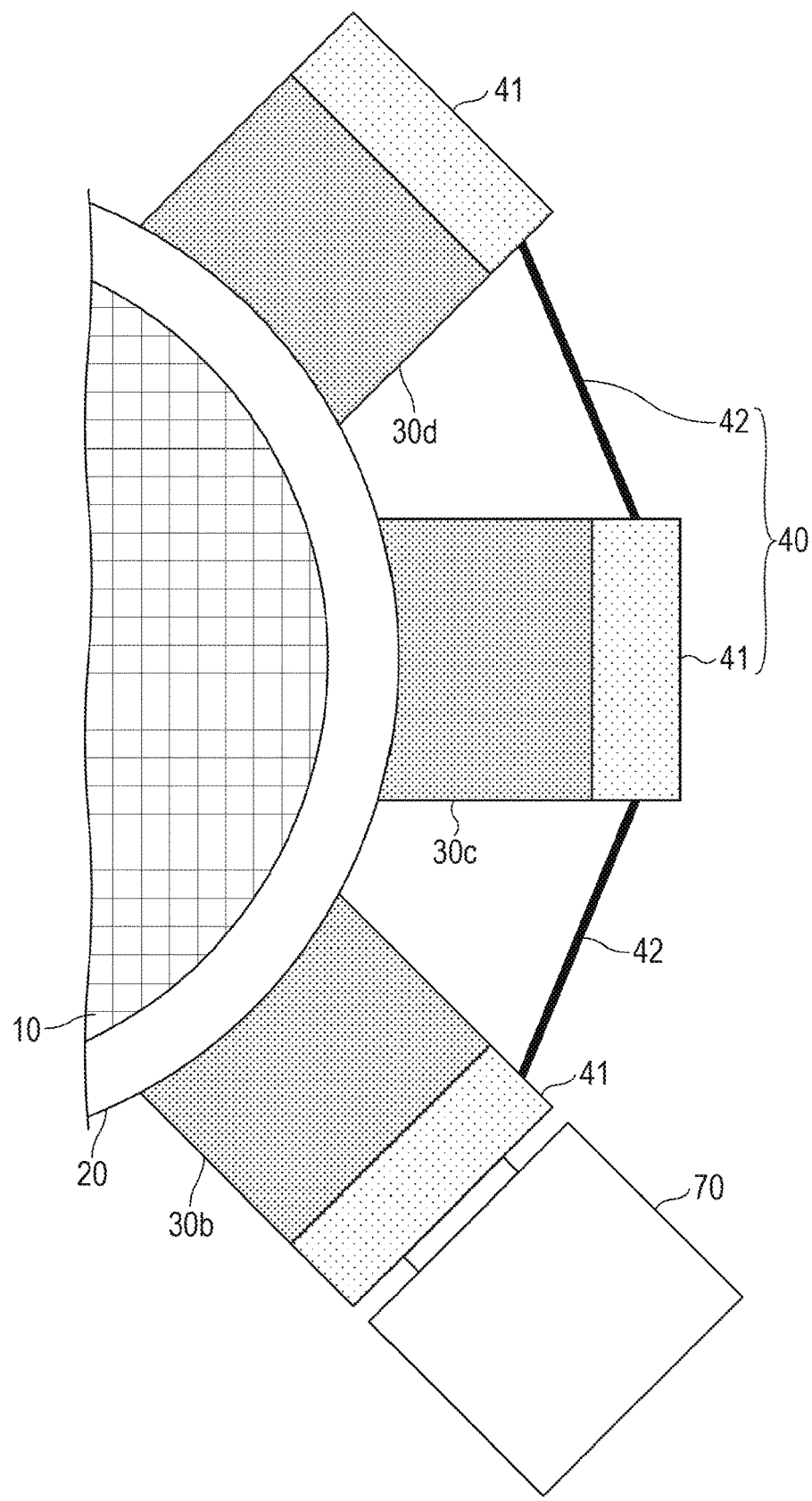
FIG. 2 is an enlarged view of a main part of the structure of the microwave irradiation device according to the first embodiment.

A microwave irradiation device according to a first embodiment will be described with reference to FIGS. 1A and 1B. FIG. 1A is a sectional view of a microwave irradiation device according to the present embodiment, and FIG. 1B is a sectional view taken along dash-dot line IA-1B in FIG. 1A. The microwave irradiation device according to the present embodiment includes, for example, a housing 20 made of a material such as metal in which an object to be heated 10 is placed, a plurality of waveguide resonators 30a to 30h installed around the outside of the housing 20, a microwave generator 50, and a microwave measurement circuit 70. Each of the plurality of waveguide resonators 30a to 30h is a microwave resonator. The waveguide resonators 30a to 30h are coupled by microwave waveguides 41 and microwave coaxial tubes 42. Further, the microwave generator 50 is coupled to one of the microwave waveguides 41. In the present embodiment, as illustrated in FIG. 2, a microwave conductor 40 for propagating a microwave is formed by the plurality of microwave waveguides 41 and microwave coaxial tubes 42. Further, the microwave irradiation device according to the present embodiment is provided with a controller 60 which is coupled to the microwave generator 50 and the microwave measurement circuit 70.

In the present embodiment, the microwave measurement circuit 70 is coupled to a microwave waveguide 41. However, the microwave measurement circuit 70 may be coupled to a microwave coaxial tube 42 or the housing 20. By coupling the microwave measurement circuit 70 to a microwave waveguide 41, a microwave of a specific frequency may be detected. Further, in the present disclosure, fine particles such as PM may be referred to as soot.

Specifically, the microwave waveguides 41 are coupled to the sides of the waveguide resonators 30a to 30h, respectively, which are opposite to the sides thereof coupled to the housing 20, and are interconnected by the microwave coaxial tubes 42. The microwave generated in the microwave generator 50 propagates through the microwave waveguide 41 and the microwave coaxial tube 42 which form the microwave conductor 40, and is supplied to each of the waveguide resonators 30a to 30h.

The plurality of waveguide resonators 30a to 30h is formed to have different microwave resonance frequencies. The microwave generator 50 is capable of changing the frequency of a microwave to be generated under the control by the controller 60 to generate a microwave having the resonance frequency in each of the waveguide resonators 30a to 30h.

Figure 3:
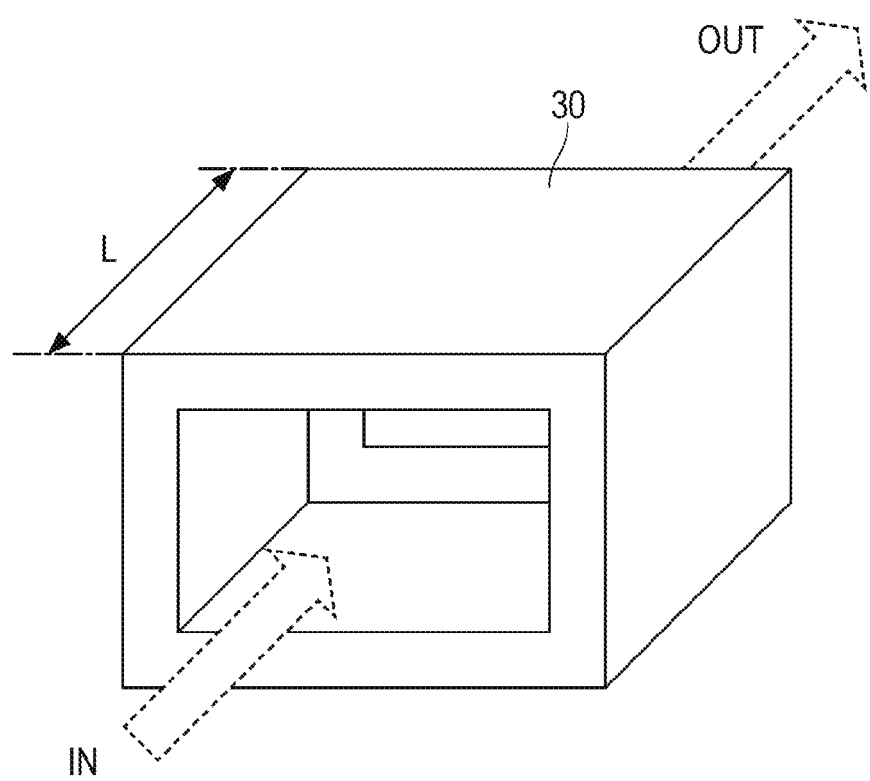
FIG. 3 is an explanatory view of a structure of a waveguide resonator.

Each of the waveguide resonators 30a to 30h is, for example, formed in a square cylindrical shape as represented by a waveguide resonator 30 in FIG. 3, and the interior thereof is hollow. The waveguide resonator 30 has somewhat narrow inlet and outlet openings at both the ends thereof and functions as a microwave resonator as microwave reflection is repeated at the inlet and the outlet. In such a waveguide resonator 30, the resonance frequency may be changed by changing the length L of the waveguide resonator 30.

In each of the waveguide resonators 30a to 30h, the outlet is coupled to the housing 20, and the inlet is coupled to each microwave waveguide 41. In the waveguide resonators 30a to 30h, the microwaves having the frequencies resonated in the waveguide resonators 30a to 30h are radiated toward the object 10 installed inside the housing 20, thereby heating the object 10.

In the present embodiment, a radiation thermometer (not illustrated) for measuring a temperature distribution of the object 10 may be provided. The temperature distribution of the object 10 is measured by the radiation thermometer, and a controller (not illustrated) may perform a control to generate a microwave of a frequency such that a microwave in a low temperature portion in the microwave generator 50 becomes strong.

In the microwave irradiation device according to the present embodiment, all of the plurality of waveguide resonators 30a to 30h may have different resonance frequencies from each other. Alternatively, some of the plurality of waveguide resonators 30a to 30h may have different resonance frequencies.

Further, since the microwave generator 50 is capable of changing the frequency of a microwave to be generated, a semiconductor element, specifically, an HEMT or the like using a nitride semiconductor may be used for the microwave generator 50. In the present embodiment, the frequency of the microwave generated in the microwave generator 50 is in the vicinity of 2.45 GHz, specifically, within a range of 2.4 GHz to 3.0 GHz.

Figure 4:
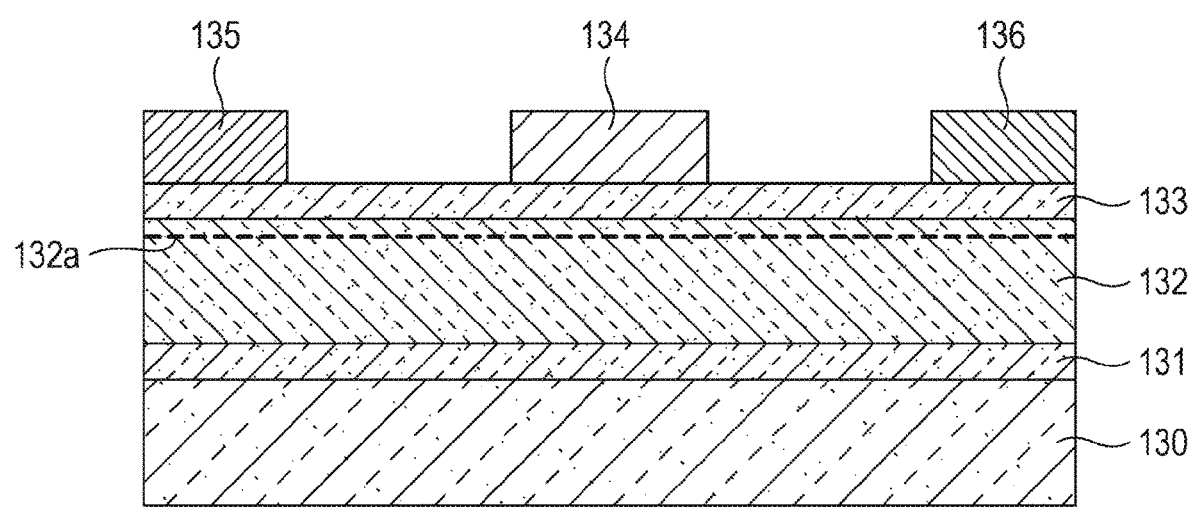
FIG. 4 is a structural view of a semiconductor device used for a microwave generator.

As illustrated in FIG. 4, the HEMT using a nitride semiconductor is formed by laminating nitride semiconductor layers on a substrate 130, for example, formed of SiC. That is, a nucleation layer 131 formed of AlN, an electron transit layer 132, and an electron supply layer 133 are laminated in this order on the substrate 130. The electron transit layer 132 is formed of GaN, and the electron supply layer 133 is formed of AlGaN or InAlN. As a result, in the electron transit layer 132, 2DEG 132a is generated in the vicinity of the interface with the electron supply layer 133. A gate electrode 134, a source electrode 135, and a drain electrode 136 are formed on the electron supply layer 133.

In the exhaust purification apparatus according to the present embodiment, the microwave generator 50 changes the frequency of the microwave to be generated. In this way, the microwave generated by changing the frequency in the microwave generator 50 resonates in any one of the waveguide resonators 30a to 30h, and the resonated microwave is radiated into the housing 20. By changing the frequency of the microwave, the waveguide resonator in which the microwave resonates changes, and thus, the microwave having the resonant frequency in each of the waveguide resonators 30a to 30h is radiated into the housing 20 from the waveguide resonator in which the microwave resonates. As a result, it is possible to uniformly heat the object 10 placed in the housing 20.

Figure 5A:
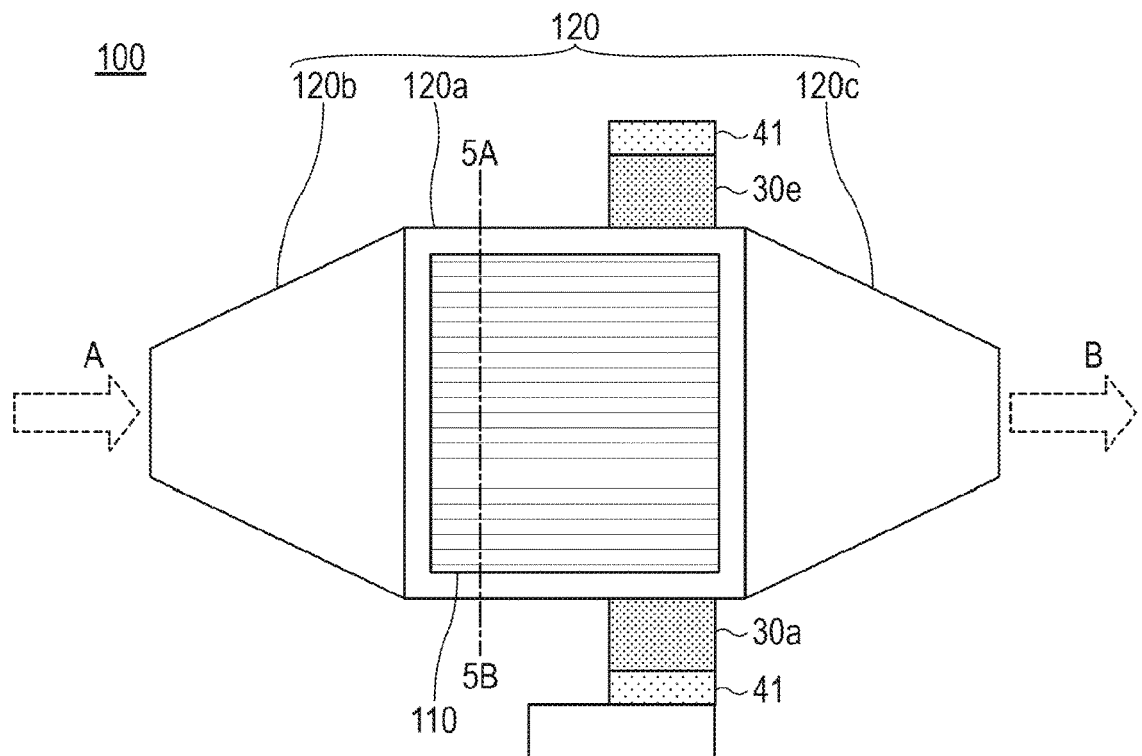
FIGS. 5A and 5B are explanatory views of a structure of an exhaust purification apparatus according to the first embodiment.
Figure 5B:
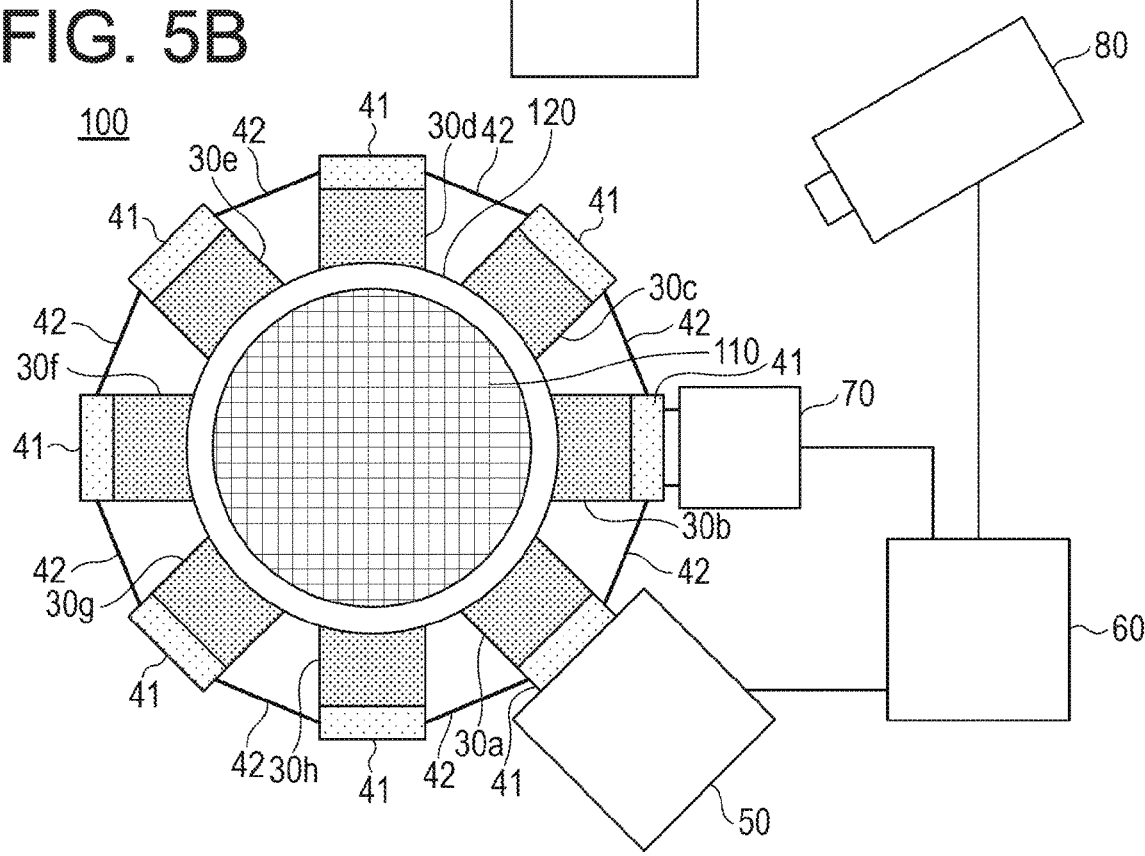

Next, the exhaust purification apparatus according to the first embodiment will be described with reference to FIGS. 5A and 5B. FIG. 5A is a sectional view taken along the direction in which an exhaust gas of the exhaust purification apparatus 100 according to the present embodiment flows, and FIG. 5 B is a sectional view taken along dash-dot line 5A-5B in FIG. 5A.

The exhaust purification apparatus 100 according to the present embodiment includes the microwave irradiation device according to the present embodiment. That is, the exhaust purification apparatus 100 includes, for example, a fine particle collection filter 110, a cylindrical housing 120, waveguide resonators 30a to 30h, a microwave waveguide 41, a microwave coaxial tube 42, a microwave generator 50, a controller 60, a microwave measurement circuit 70, and a radiation thermometer 80. The waveguide resonators 30a to 30h are installed around the housing 120 and formed so as to be radiated toward the fine particle collection filter 110 installed in the housing 120. The waveguide resonators 30a to 30h may be installed on the downstream side in the direction in which an exhaust gas of the exhaust purification apparatus flows.

The fine particle collection filter 110 is, for example, formed of a DPF. For example, the DPF is formed by a honeycomb structure in which adjacent vents are alternately closed, and an exhaust gas is discharged from vents different from vents at the inlet.

The housing 120 is made of a metallic material such as stainless steel and includes a housing body 120a covering the periphery of the fine particle collection filter 110, and an inlet port 120b and an outlet port 120c which are coupled to the housing body 20a. In the exhaust purification apparatus 100 according to the present embodiment, an exhaust gas or the like discharged from an engine or the like flows from the inlet port 120b into the housing 120 in a direction indicated by a broken line arrow A, and is purified while passing through the fine particle collection filter 110 installed in the housing body 120a. Thereafter, the exhaust gas purified by the fine particle collection filter 110 is discharged from the outlet port 120c in a direction indicated by a broken line arrow B.

In the exhaust purification apparatus according to the present embodiment, the microwave generator 50 changes the frequency of the microwave to be generated. The microwave generated in the microwave generator 50 resonates in one of the waveguide resonators 30a to 30h, and the resonated microwave is radiated into the housing 120. By changing the frequency of the microwave, the waveguide resonator in which the microwave resonates changes, and thus, the microwave having the resonant frequency in each of the waveguide resonators 30a to 30h is radiated into the housing 120 from the waveguide resonator in which the microwave resonates. As a result, it is possible to uniformly heat the fine particle collection filter 110 installed in the housing 20. The radiation thermometer 80 is capable of measuring the temperature in the fine particle collection filter 110 for each region. The radiation thermometer 80 is coupled to the controller 60, and the controller 60 may control the frequency to be generated in the microwave generator 50 based on the information on the temperature distribution measured by the radiation thermometer 80. Instead of the radiation thermometer 80, a plurality of thermocouples may be embedded in the fine particle collection filter 110 and may measure the temperature of each region in the fine particle collection filter 110.

Figure 6:
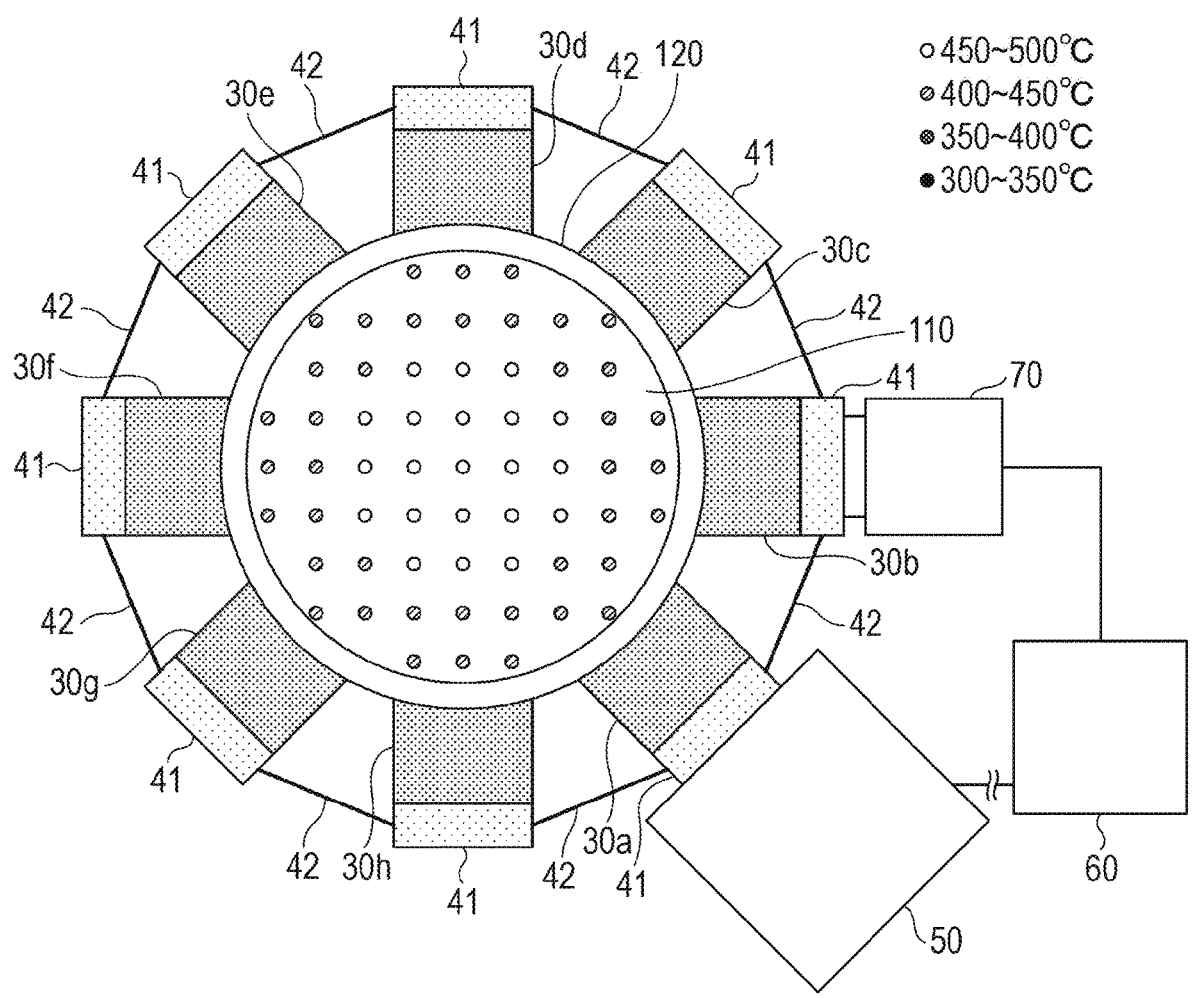
FIG. 6 is an explanatory view (1) of a temperature distribution in the exhaust purification apparatus.

Next, a simulation result of the temperature distribution at the highest temperature when heating the fine particle collection filter 110 will be described. FIG. 6 illustrates the temperature distribution at the highest temperature in the fine particle collection filter 110 when generating a microwave while varying its frequency in the microwave generator 50 in the exhaust purification apparatus according to the present embodiment. The resonance frequency in the waveguide resonator 30a is 2.42 GHz, the resonance frequency in the waveguide resonator 30b is 2.43 GHz, and the resonance frequency in the waveguide resonator 30c is 2.44 GHz. The resonance frequency in the waveguide resonator 30d is 2.45 GHz, the resonance frequency in the waveguide resonator 30e is 2.46 GHz, and the resonance frequency in the waveguide resonator 30f is 2.47 GHz. The resonance frequency in the waveguide resonator 30g is 2.48 GHz, and the resonance frequency in the waveguide resonator 30h is 2.49 GHz. For this reason, the frequency of the microwave generated in the microwave generator 50 is varied in the range of 2.42 GHz to 2.49 GHz.

Figure 7:
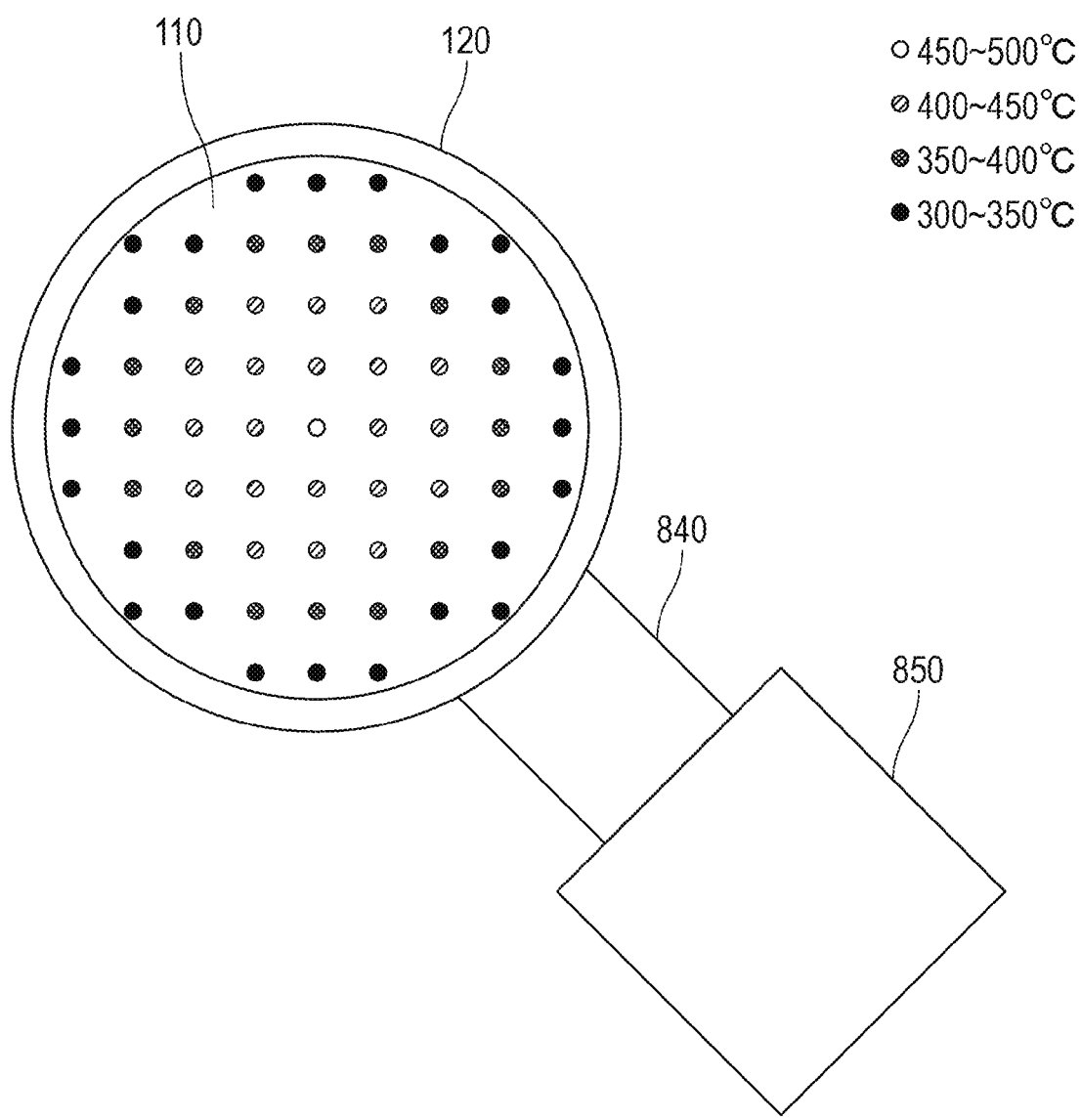
FIG. 7 is an explanatory view (2) of a temperature distribution in the exhaust purification apparatus.

FIG. 7 illustrates the temperature distribution of the highest temperature in the fine particle collection filter 110 when the frequency of the microwave generated in the microwave generation unit 50 is single. Specifically, the exhaust purification apparatus illustrated in FIG. 7 includes, for example, a fine particle collection filter 110, a housing 120, a microwave conductor 840, and a microwave generator 850. The housing 120 and the microwave generator 850 are coupled to each other by the microwave conductor 840. The microwave of 2.45 GHz generated by the microwave generator 850 is irradiated onto the fine particle collection filter 110 installed inside the housing 120 via the microwave conductor 840.

As illustrated in FIG. 6, in the exhaust purification apparatus according to the present embodiment, the highest temperature when heating the fine particle collection filter 110 is in the range of 400° C. to 500° C., and the fine particle collection filter 110 is substantially uniformly heated in its entirety. In addition, the temperature of the vicinity of the housing 120 around the fine particle collection filter 110 is also 400° C. or higher. Therefore, it is possible to substantially uniformly burn and remove fine particles PM deposited in the central portion and the peripheral portion of the fine particle collection filter 110. Therefore, it is possible to regenerate the fine particle collection filter 110 completely or almost completely while hardly leaving deposited fine particles such as the PM.

Meanwhile, as illustrated in FIG. 7, in the case of irradiating a microwave of a single frequency, the temperature of the fine particle collection filter 110 is 350° C. or less at the peripheral portion in the vicinity of the housing 120, which is lower than 450° C. to 500° C. at the central portion. Therefore, in the fine particle collection filter 110, it is possible to burn and remove deposited fine particles such as PM in the central portion where the temperature is high. However, since the temperature is low in the peripheral portion, burning and removing deposited fine particles such as PM in the peripheral portion are not sufficiently performed. For this reason, the regeneration of the fine particle collection filter 110 is incomplete.

As described above, in the microwave irradiation device according to the present embodiment, it is possible to substantially uniformly heat the fine particle collection filter 110 to be heated.

(Method of Measuring Deposited Fine Particles Such as PM)

Next, a method of measuring fine particles such as PM deposited in the fine particle collection filter 110 in the exhaust purification apparatus of this embodiment will be described. The microwave measurement circuit 70 is used for the measurement. In the present embodiment, the microwave measurement circuit 70 is coupled to the microwave waveguide 41 and measures the intensity of a microwave which is generated by the microwave generator 50 and supplied into the housing 120 via the microwave waveguide 41. For the microwave measurement circuit 70, for example, a Schottky diode formed of Si or the like is used.

Specifically, when a microwave with predetermined power is irradiated from the microwave generator 50 and fine particles such as PM are deposited in the fine particle collection filter 110, the microwave is absorbed by the fine particles such as the PM. The amount of the microwave absorbed depends on the amount of the fine particles such as the PM deposited in the fine particle collection filter 110.

Therefore, when the amount of the fine particles such as the PM deposited in the fine particle collection filter 110 is large, the absorption of the microwave increases and the intensity of the microwave in the housing 120 decreases. Thus, the intensity of the microwave detected by the microwave measurement circuit 70 also becomes low. In addition, when the amount of the fine particles such as the PM deposited in the fine particle collection filter 110 is small, the absorption of the microwave decreases and the intensity of the microwave in the housing 120 does not substantially decrease, and the intensity of the microwave detected by the microwave measurement circuit 70 becomes high.

Therefore, by measuring the intensity of the microwave in the microwave measurement circuit 70, it is possible to grasp the amount of the fine particles such as PM deposited in the fine particle collection filter 110. In this case, the intensity of the microwave generated by the microwave generator 50 to measure the amount of the fine particles such as the PM deposited in the fine particle collection filter 110 is set to be lower than that in a case of removing the fine particles such as the PM.

Figure 8:
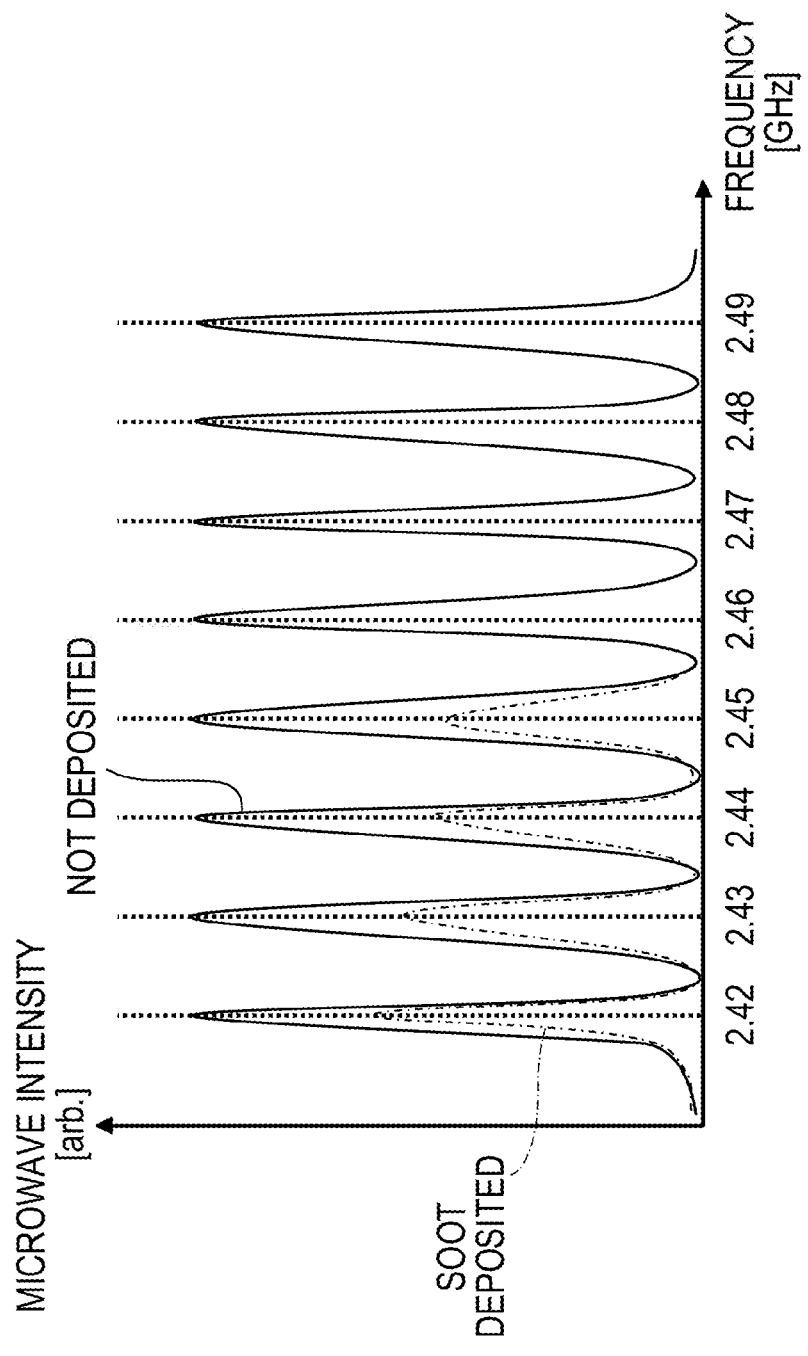
FIG. 8 is an explanatory view of characteristics of a microwave detected in a microwave measurement circuit.

More specifically, a case where the fine particles such as the PM are deposited in the fine particle collection filter 110 will be described with reference to FIG. 8. When the microwave generated by the microwave generator 50 is supplied to the microwave waveguide 41, the microwave resonates at a predetermined resonance frequency.

In a state in which nothing is deposited in the fine particle collection filter 110, since the microwave resonates at a predetermined resonance frequency and fine particles such as PM are not present in the fine particle collection filter 110, the microwave is hardly absorbed. Therefore, in the microwave measurement circuit 70, a microwave with a relatively high intensity is detected at a predetermined resonance frequency.

Meanwhile, in a state where fine particles such as PM, that is, soot or the like, are deposited in the fine particle collection filter 110, since the microwave is absorbed in the fine particles such as PM deposited in the fine particle collection filter 110, the intensity of the microwave decreases. Therefore, in this state, a microwave having a lower intensity than the state in which nothing is deposited in the fine particle collection filter 110 is detected in the microwave measurement circuit 70.

(Control Method 1 of Exhaust Purification Apparatus)

Figure 9:
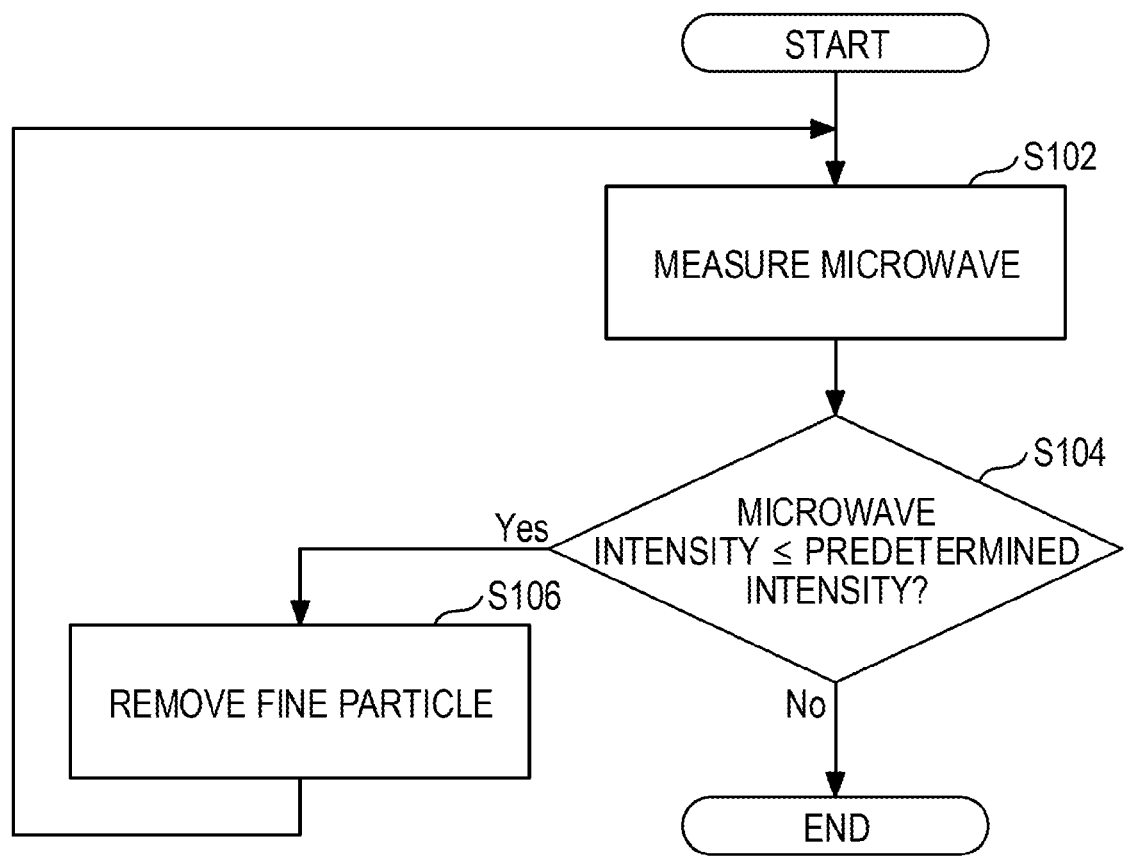
FIG. 9 is a flowchart for explaining a control method 1 of the exhaust purification apparatus.

Next, the control of the exhaust purification apparatus based on the information measured by the microwave measurement circuit 70 in the present embodiment will be described with reference to FIG. 9. This control is performed by the controller 60 or the like.

First, in step S102, a microwave is generated from the microwave generator 50, and the intensity and the frequency of the microwave are measured by the microwave measurement circuit 70.

Next, in step S104, it is determined whether or not the peak of the intensity of the microwave measured by the microwave measurement circuit 70 in step S102 is equal to or less than the predetermined intensity. Specifically, referring to FIG. 8, it is determined whether or not the intensity of the microwave at each resonance frequency is equal to or less than the microwave intensity measured when fine particles such as PM are not deposited. When it is determined that the peak of the intensity of the microwave measured by the microwave measurement circuit 70 in step S102 is equal to or less than the predetermined intensity, it is determined that a certain amount or more of fine particles such as PM is deposited in the fine particle collection filter 110, and the control proceeds to step S106. Meanwhile, when it is determined that the peak of the intensity of the microwave measured by the microwave measurement circuit 70 in step 102 exceeds the predetermined intensity, it is determined that the amount of the fine particles such as PM deposited in the fine particle collection filter 110 is less than the certain amount, and the control of the exhaust purification apparatus is ended.

In step S106, forced regeneration is started by irradiating a microwave to the fine particles such as PM deposited in the fine particle collection filter 110 or injecting fuel to the fine particles in order to remove the fine particles. Thereafter, the control proceeds to step S102.

As described above, based on the information on the intensity of the microwave measured by the microwave measurement circuit 70 and the information on the microwave intensity at each resonance frequency, it is possible to perform regeneration or the like of the fine particle collection filter 110.

(Control Method 2 of Exhaust Purification Apparatus)

Figure 10:
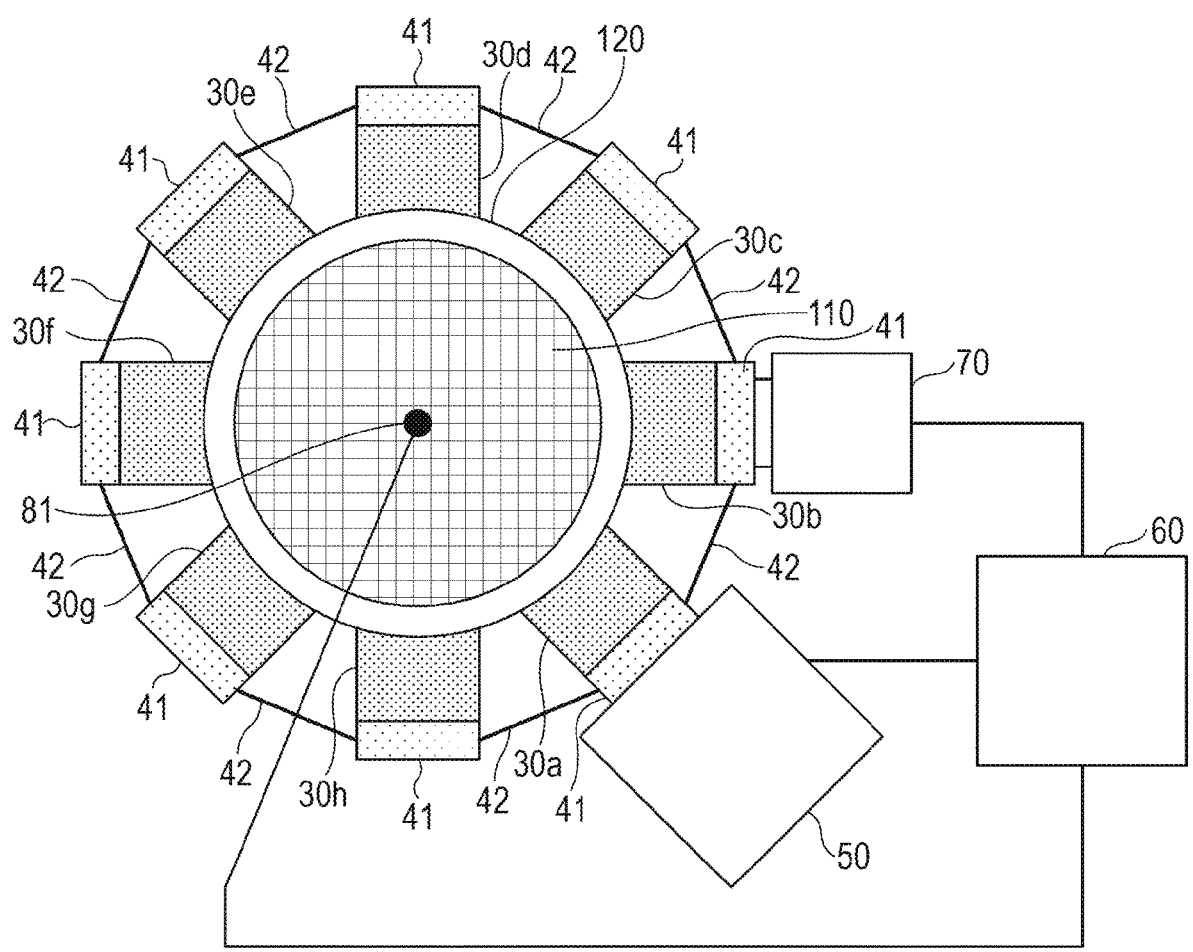
FIG. 10 is an explanatory view (2) of a structure of the exhaust purification apparatus according to the first embodiment.
Figure 12:
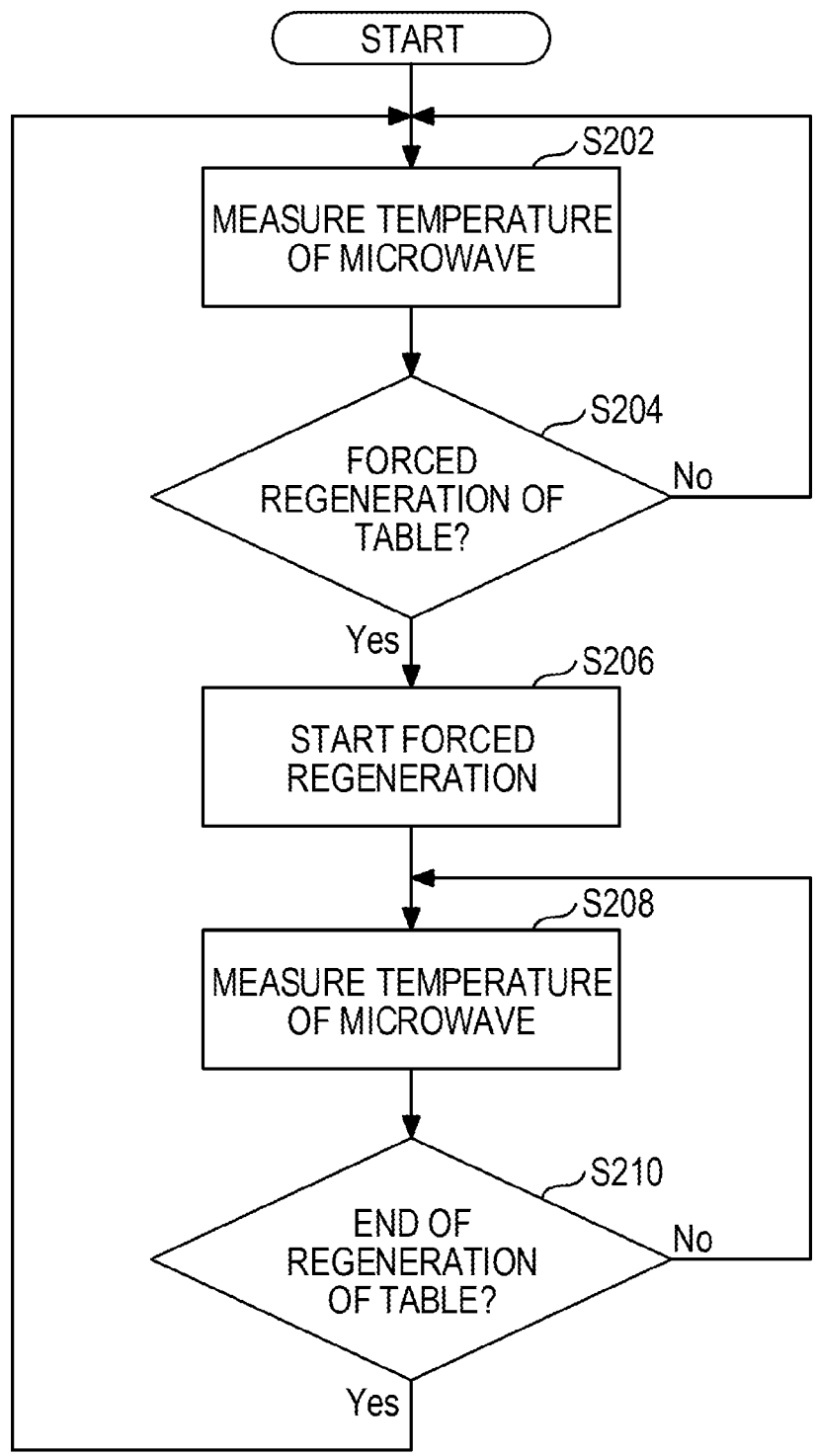
FIG. 12 is a flowchart for explaining the control method 2 of the exhaust purification apparatus.

Next, another control of the exhaust purification apparatus based on the information measured by the microwave measurement circuit 70 in the present embodiment will be described with reference to FIGS. 10 to 12. As illustrated in FIG. 10, the control is carried out by using a table illustrated in FIG. 11, based on the information of temperature measured by a thermometer 81 installed at the front stage of the fine particle collection filter 110 and the information of the microwave intensity measured by the microwave measurement circuit 70. A thermocouple is used for the thermometer 81.

The control is performed by the controller 60. That is, the controller 60 determines the start of forced regeneration and the end of regeneration from the information of temperature measured by the thermometer 81 and the information of the microwave intensity measured by the microwave measurement circuit 70, based on the table illustrated in FIG. 11. The control will be described with reference to FIG. 12. In the following description, in the microwave measurement circuit 70, it is assumed that when the detected intensity of the microwave is low, an output voltage output from the microwave measurement circuit 70 becomes high, and when the microwave intensity is high, the output voltage output from the microwave measurement circuit 70 becomes low.

First, in step S202, a microwave is generated from the microwave generator 50, the intensity of the microwave is measured by the microwave measurement circuit 70, and a temperature is measured by the thermometer 81.

Next, in step S204, it is determined whether or not the intensity (output voltage) of the microwave measured by the microwave measurement circuit 70 and the temperature measured by the thermometer 81 in step S202 correspond to the forced regeneration in the table illustrated in FIG. 11. When it is determined that the intensity and the temperature correspond to the forced regeneration in the table illustrated in FIG. 11, the control proceeds to step S206. When it is determined that the intensity and the temperature do not correspond to the forced regeneration, step S202 is performed again.

In step S206, the forced regeneration is started by irradiating a microwave to the fine particles such as PM deposited in the fine particle collection filter 110 or injecting fuel to the fine particles in order to remove the fine particles.

Next, in step S208, a microwave is generated from the microwave generator 50, the intensity of the microwave is measured by the microwave measurement circuit 70, and a temperature is measured by the thermometer 81.

Next, in step S210, it is determined that the intensity (output voltage) of the microwave measured by the microwave measurement circuit 70 and the temperature measured by the thermometer 81 in step S208 correspond to the end of the regeneration in the table illustrated in FIG. 11. When it is determined that the intensity and the temperature correspond to the end of the regeneration in the table illustrated in FIG. 11, it is determined that the regeneration of the DPF has ended, and the control proceeds to step S202. When it is determined that the intensity and the temperature do not correspond to the end of the regeneration, step S208 is performed again while the regeneration of the DPF is continued.

As described above, in the present embodiment, for example, the regeneration of the fine particle collection filter 110 may be performed based on the information of the microwave measured by the microwave measurement circuit 70. In addition, the measurement of the intensity of the microwave by the microwave measurement circuit 70 and the measurement of the temperature by the thermometer 81 may be always monitored. It has been illustrated in the above that the thermometer 81 is used. However, a radiation thermometer 80 may be used instead of the thermometer 81.

Figure 13:
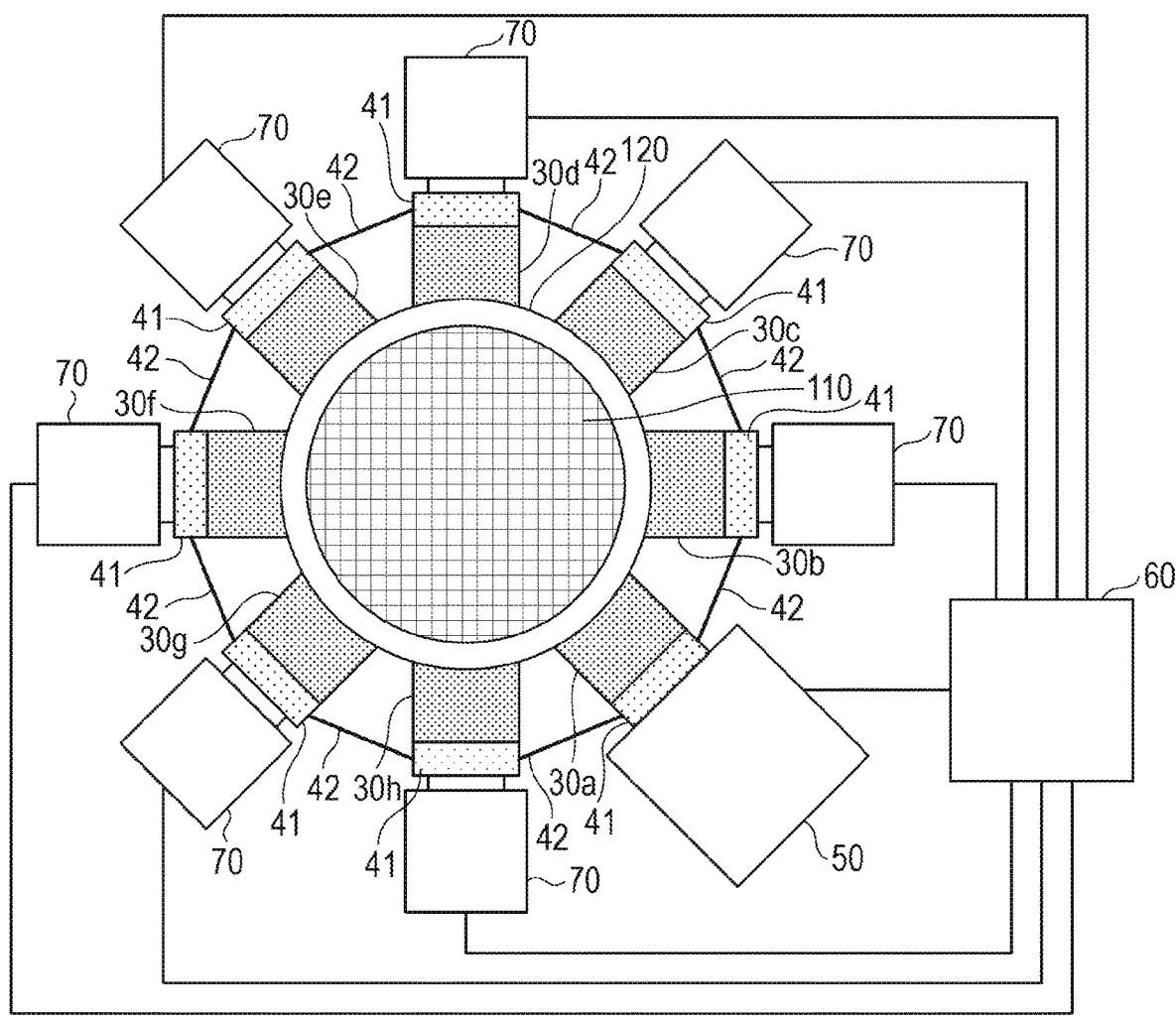
FIG. 13 is an explanatory view (3) of the structure of the exhaust purification apparatus in the first embodiment.

In addition, as illustrated in FIG. 13, the exhaust purification apparatus according to the present embodiment may have a structure in which the microwave measurement circuit 70 is installed in each of the microwave waveguides 41.

Second Embodiment

Next, a second embodiment will be described.

Figure 14:
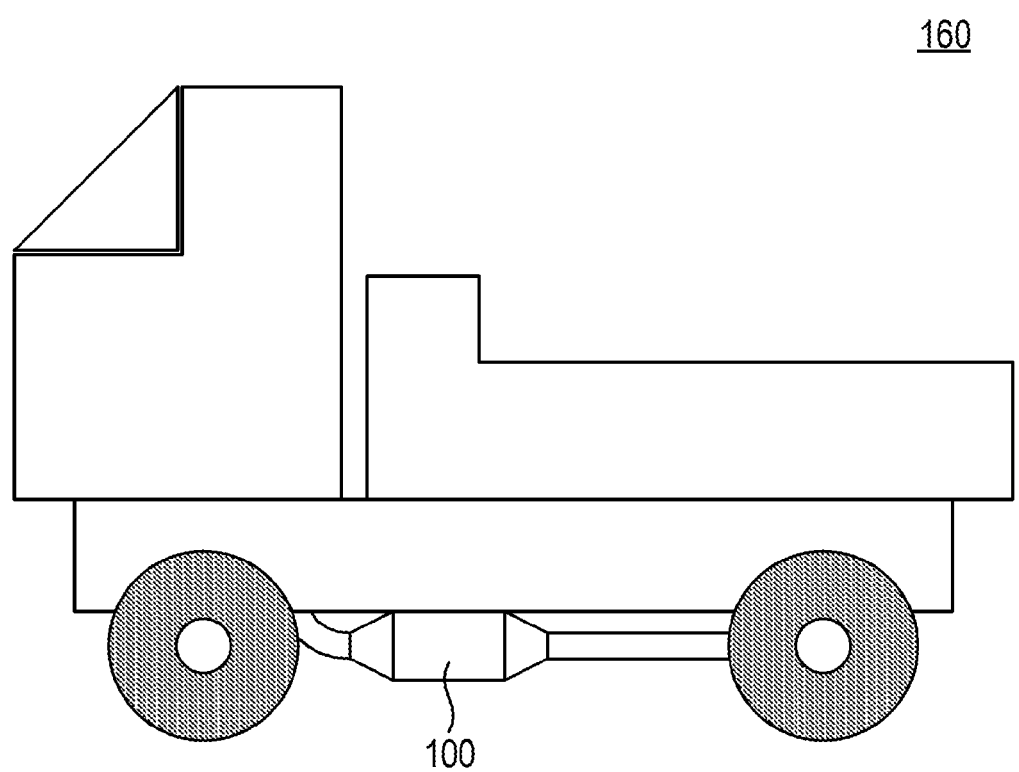
FIG. 14 is an explanatory view of an automobile according to a second embodiment.

FIG. 14 illustrates an automobile 160 according to the second embodiment, which is equipped with the exhaust purification apparatus 100 according to the first embodiment. In the automobile 160 according to the present embodiment, an exhaust gas generated in the automobile 160 may be purified by the exhaust purification apparatus 100.

Figure 15:
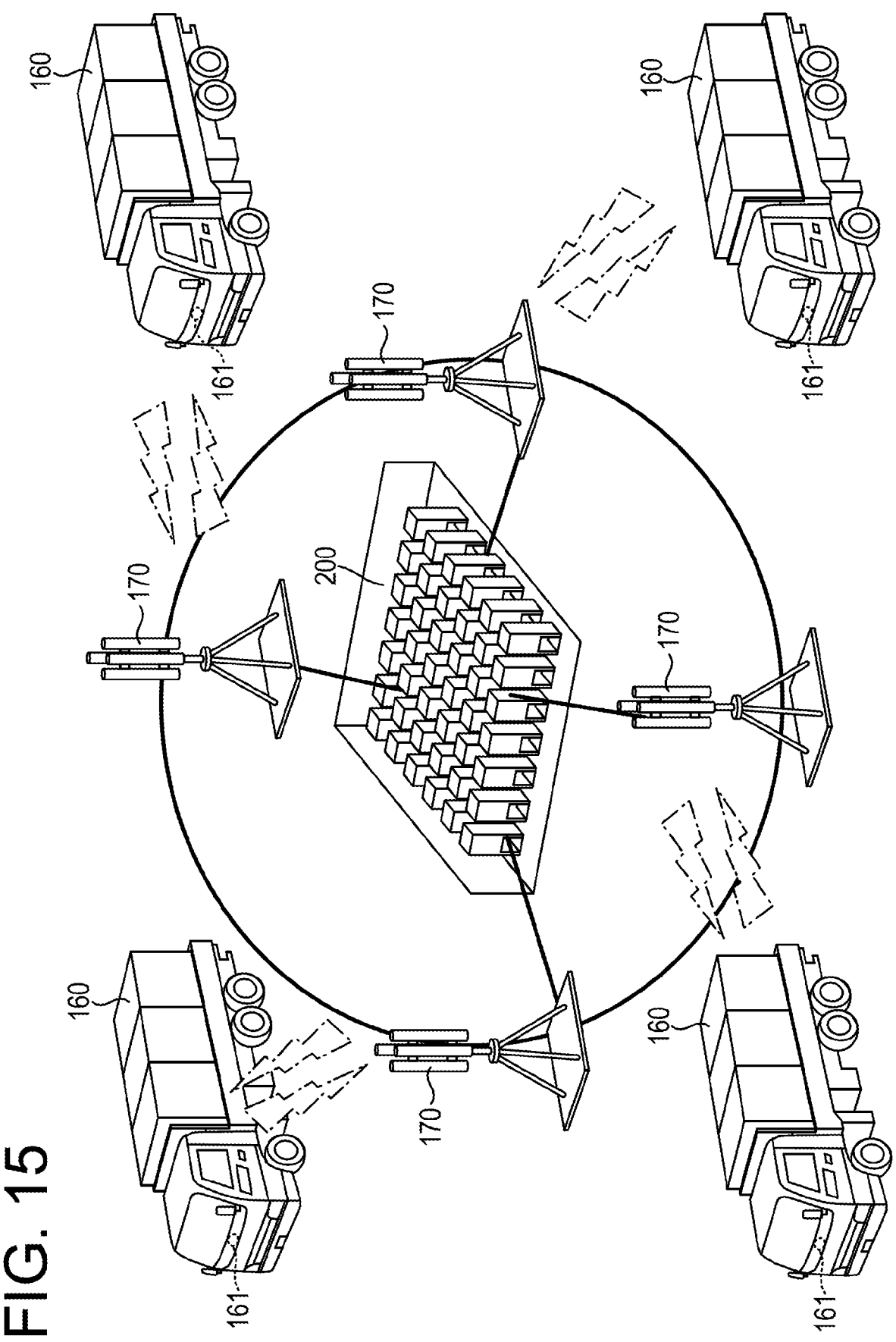
FIG. 15 is an explanatory view of a management system according to the second embodiment.

FIG. 15 illustrates a management system according to the present embodiment. The management system according to the present embodiment includes a plurality of radio base stations 170 and a route management server 200 coupled to the plurality of radio base stations 170. A transceiver 161 is mounted on the automobile 160 and may conduct information communication by radio with any one of the wireless base stations 170. In the present embodiment, the amount of soot deposited in the fine particle collection filter 110 of the exhaust purification apparatus 100 attached to the automobile 160 is detected by the exhaust purification apparatus 100. The amount of soot detected by the exhaust purification apparatus 100 to have been deposited in the fine particle collection filter 110 is transmitted to the radio base station 170 via the transceiver 161 mounted on the automobile 160 and gathered in the route management server 200. The route management server 200 predicts the amount of soot that will be deposited later, based on the amount of the deposited soot, and searches for an optimum route. The obtained optimum route is transmitted from the radio base station 170 to the automobile 160.

The semiconductor device according to the first embodiment may be applied to, for example, a radar, an airplane, a ship, an aerodrome, and a seaport, in addition to the application described above.

Third Embodiment

Figure 16:
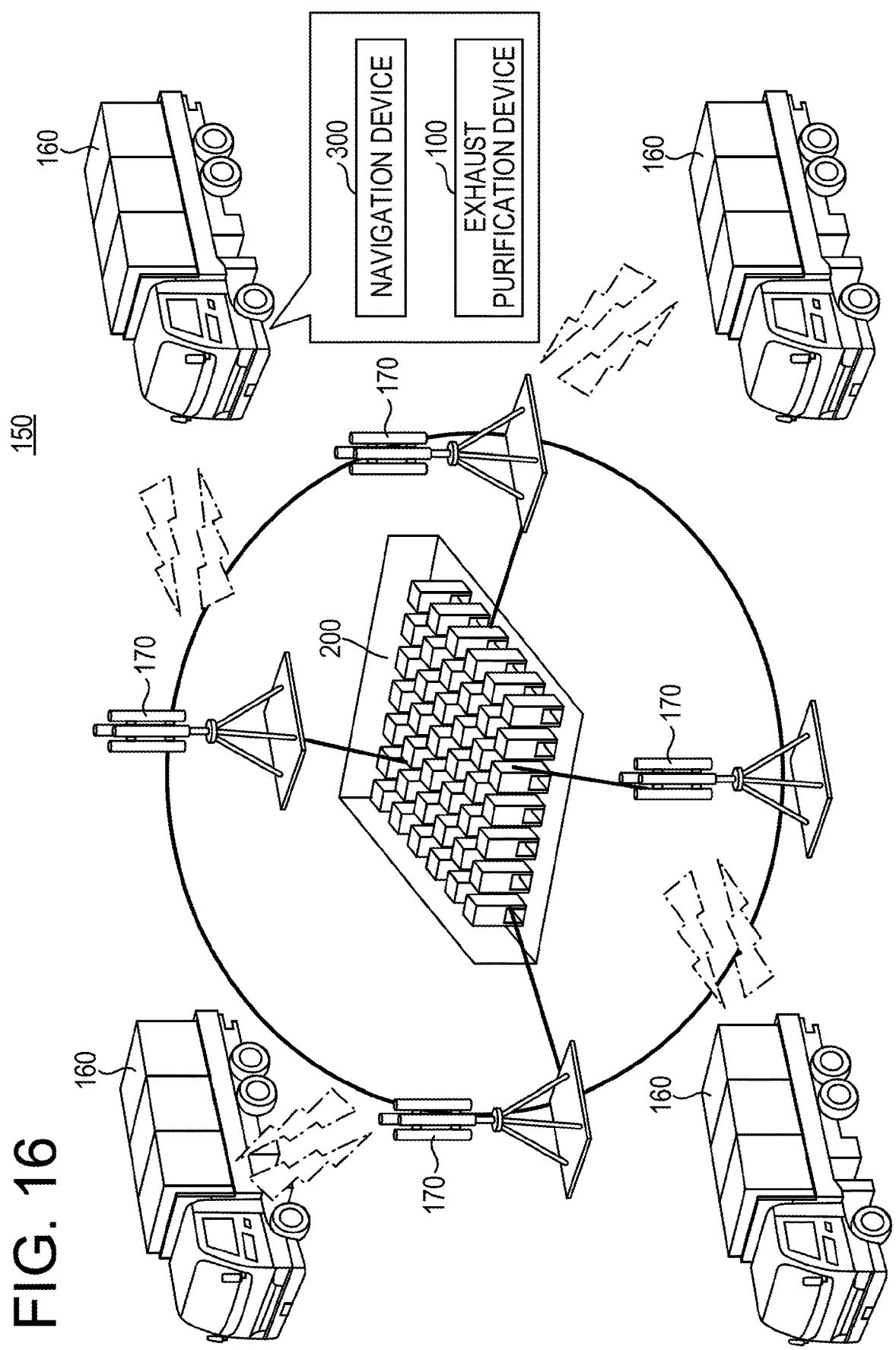
FIG. 16 is a view illustrating a route management system according to a third embodiment.

Hereinafter, a route management system according to a third embodiment will be described with reference to the drawings. FIG. 16 is a view for explaining a route management system.

The route management system 150 according to the present embodiment includes a route management server 200 and a car navigation device (hereinafter referred to as a navigation device) 300 mounted on the automobile 160 of, for example, a deliverer. The route management server 200 and the navigation device 300 communicate with each other by radio via the radio base station 170. In the present embodiment, the automobile may be also referred to as a vehicle. Further, it is assumed that a transceiver corresponding to the transceiver 161 in the second embodiment is included in the car navigation device 300.

The automobile 160 of the present embodiment is, for example, a truck equipped with, for example, a diesel engine. The automobile 160 is provided with a DPF for collecting the PM which contains carbon as a main component and is discharged from the diesel engine. This DPF is the fine particle collection filter 110 in the first embodiment and the like.

The automobile 160 of the present embodiment detects an amount of PM deposited in the DPF and notifies the navigation device 300 of the detected amount of PM.

The automobile 160 also includes an exhaust purification apparatus 100 for cleaning the PM deposited in the DPF. The exhaust purification apparatus 100 cleans and regenerates the DPF by burning and removing the PM captured by the DPF.

The cleaning refers to burning and removing the PM collected by the DPF to regenerate the DPF collecting performance of the DPF. Further, the regeneration of the DPF includes continuous regeneration and forced regeneration. In the following embodiment, the "cleaning" indicates the forced regeneration and a running route is presented to reduce the number of times of the forced regeneration.

The forced regeneration refers to forcibly regenerating the PM collected in the DPF by using, for example, post injection or injection in an exhaust pipe. The continuous regeneration refers to continuously regenerating the PM collected in the DPF, for example, using $NO_2$ as an oxidizing agent with NO in an exhaust gas as an oxidation catalyst.

In the route management system 150 according to the present embodiment, the route management server 200 receives candidate running routes from the navigation device 300 to the destination, and the amount of detected PM. Next, the route management server 200 calculates an estimated amount of PM to be deposited until arriving at the destination, for each candidate running route.

Then, the route management server 200 determines whether or not the cleaning (forced regeneration) is performed in the automobile 160 before arriving at the destination, from the sum of the detected amount of PM and the estimated amount of PM.

In other words, in the present embodiment, the route management server 200 estimates how much the amount of PM being currently deposited in the DPF of the automobile 160 increases when the automobile 160 runs on a running route which is one of the candidate running routes. Then, based on the estimation result, the route management server 200 determines whether or not the cleaning (forced regeneration) is performed in the automobile 160 before arriving at the destination.

Then, when the cleaning of the DPF is required, the route management server 200 causes the navigation device to display a running route in which the number of times of the cleaning is reduced.

In the following description, the amount of PM deposited in the DPF will be referred to as a PM deposition amount, and the amount of PM estimated by the route management server 200 to be deposited when running on a running route will be referred to as an estimated PM deposition amount.

As described above, in the present embodiment, based on the estimated PM deposition amount which is the sum of the PM deposition amount detected in the automobile 160 and the PM deposition amount estimated to be deposited by running on the running route, a running route with the less number of times of cleaning is presented to the driver of the automobile 160.

Figure 17:
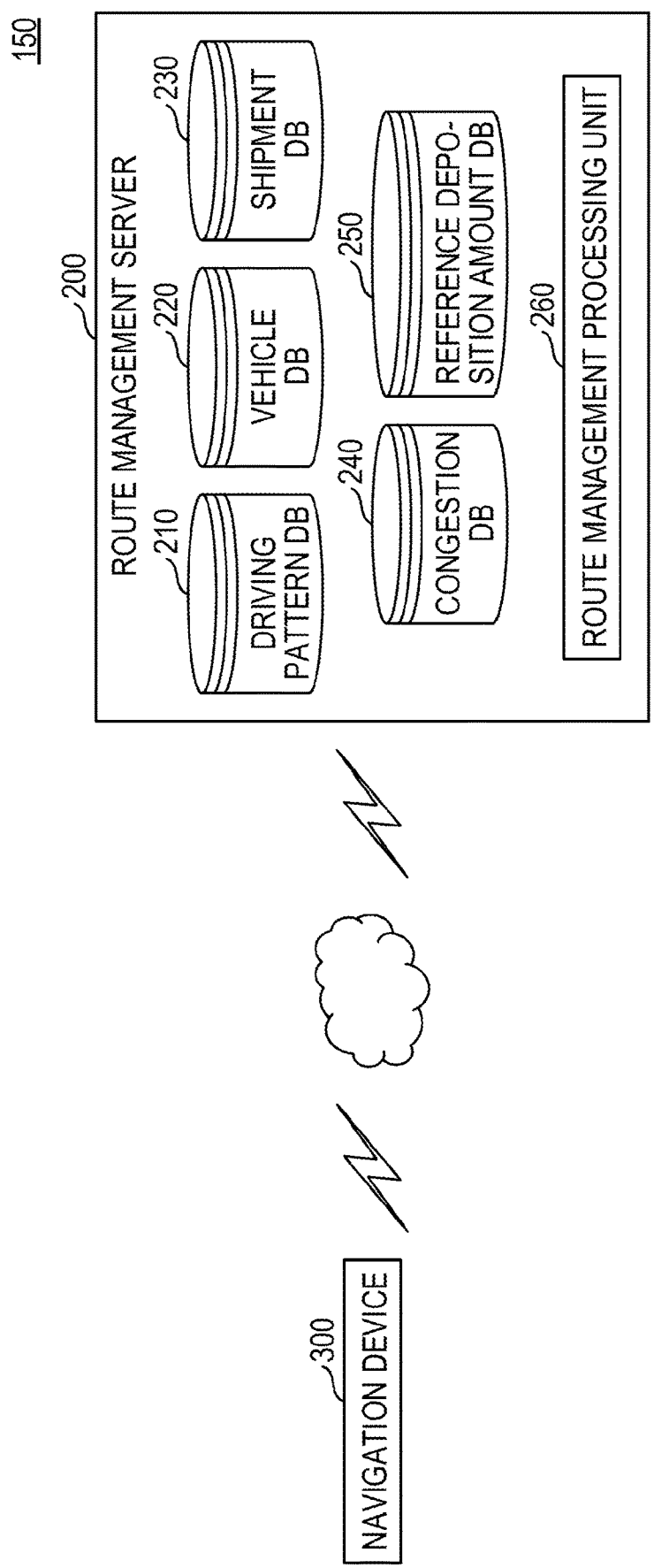
FIG. 17 is a view illustrating a system configuration of the route management system according to the third embodiment.

Hereinafter, the system configuration of the route management system 150 of the present embodiment will be described with reference to FIG. 17. FIG. 17 is a view for explaining the system configuration of the route management system.

The route management system 150 of the present embodiment includes a route management server 200 and a navigation device 300.

The navigation device 300 may be fixed to the automobile 160 or may be a portable navigation device implemented by, for example, a portable terminal. In addition, the navigation device 300 acquires the PM deposition amount detected in the exhaust purification apparatus 100 installed in the automobile 160.

The navigation device 300 extracts a candidate running route when a navigation start request is input together with, for example, a driver ID for identifying a driver, an identifier for identifying a vehicle, a departure point, or a destination. Then, the navigation device 300 notifies the route management server 200 of the information input along with the start request, the candidate running route, and the PM deposition amount of the vehicle on which the navigation device is mounted.

The route management server 200 of the present embodiment includes a driving pattern database 210, a vehicle database 220, a shipment database 230, a congestion database 240, a reference deposition amount database 250, and a route management processing unit 260.

The driving pattern database 210 of the present embodiment stores information indicating a driving pattern for each driver. In other words, the driving pattern database 210 stores information indicating the easiness of PM deposition in the DPF for each driver.

The vehicle database 220 of the present embodiment stores information indicating the easiness of PM deposition in the DPF for each vehicle. The shipment database 230 of the present embodiment stores information indicating the easiness of PM deposition in the DPF for each shipment. The congestion database 240 stores information indicating the easiness of PM deposition in the DPF for each extent of congestion.

The reference deposition amount database 250 stores information indicating the reference value of the PM deposition amount for each road. Details of each of the above-mentioned databases will be described later.

The route management processing unit 260 calculates the estimated PM deposition amount for each running route based on, for example, the information identifying the driver or the vehicle, the candidate running route, and the PM deposition amount acquired from the navigation device 300. Then, based on the estimated PM deposition amount, the route management processing unit 260 determines whether or not the forced regeneration is performed before the automobile 160 arrives at the destination. When it is determined that the forced regeneration is performed, the route management processing unit 260 causes another running route to be displayed on the navigation device 300.

Figure 18:
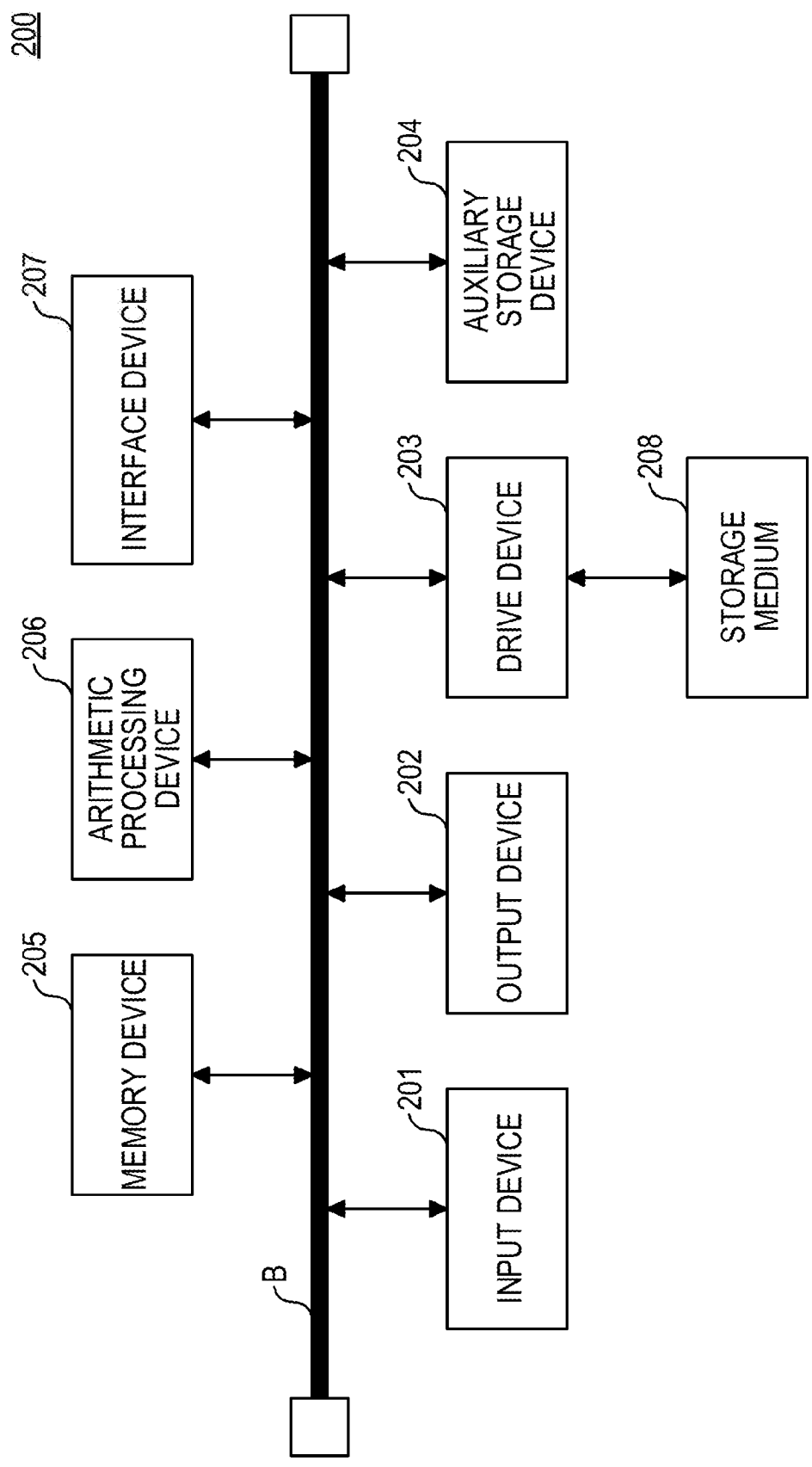
FIG. 18 is a view illustrating an example of a hardware device of a route management server.

The route management server 200 of the present embodiment will be further described below. FIG. 18 is a view illustrating an example of a hardware device of the route management server.

The route management server 200 of the present embodiment includes an input device 201, an output device 202, a drive device 203, an auxiliary storage device 204, a memory device 205, an arithmetic processing device 206, and an interface device 207 which are interconnected via a bus B.

The input device 201 is intended to input various kinds of information and is implemented by, for example, a keyboard or a mouse. The output device 202 is intended to output various kinds of information and is implemented by, for example, a display. The interface device 207 includes, for example, a modem or a LAN card and is used for connection to a network.

A route management program is at least a portion of various programs for controlling the route management server 200. The route management program is provided by, for example, distribution of a storage medium 208 or downloading from a network. Examples of the storage medium 208 storing the route management program may be various types of storage media, including a storage medium that optically, electrically or magnetically records information such as a CD-ROM, a flexible disk or a magneto-optical disk, and a semiconductor memory that electrically records information such as a ROM or a flash memory.

When the storage medium 208 storing the route management program is set in the drive device 203, the route management program is installed from the storage medium 208 into the auxiliary storage device 204 via the drive device 203. The route management program downloaded from the network is installed in the auxiliary storage device 204 via the interface device 207.

The auxiliary storage device 204 stores the installed route management program and also stores, for example, required files and data. The memory device 205 reads and stores the route management program from the auxiliary storage device 204 when a computer is activated. Then, the arithmetic processing unit 206 implements various processes to be described later in accordance with the route management program stored in the memory device 205.

Further, since the navigation device 300 of the present embodiment is implemented by a computer having the same hardware configuration as that of the route management server 200 illustrated in FIG. 18, explanation of which will be omitted.

Next, each of the databases of the route management server 200 will be described with reference to FIGS. 19 to 23. Each of the databases to be described below may be provided in the auxiliary storage device 204 of the route management server 200 or may be stored in an external storage device of the route management server 200.

FIG. 19 is a view illustrating an example of the driving pattern database. The driving pattern database 210 of the present embodiment has, as information items, a driver ID and a driving pattern which are associated with each other. In the following description, the information including the value of the item "driver ID" and the value of the item "driving pattern" will be referred to as driving pattern information.

The value of the item "driver ID" is an identifier for identifying a driver who drives a vehicle, and is assigned to each driver.

The value of the item "driving pattern" is further associated with three items. The items associated with the item "driving pattern" are items indicating the shape of a road, including "straight," "gentle curve," and "sharp curve" in the example of FIG. 19. Here, the "sharp curve" may refer to a curve having a curve radius equal to or smaller than a threshold set for the curve radius of a road and the "gentle curve" may refer to a curve having a curve radius larger than the threshold.

In the example of FIG. 19, the number of the items indicating the shape of the road is three. However, the present disclosure is not limited thereto. The number of the items indicating the shape of the road may be fewer or more.

The values of the item "driving pattern" and the item "straight" are index values indicating the easiness of PM deposition in the DPF when the driver indicated by the driver ID drives the vehicle on a straight road. The values of the item "driving pattern" and the item "gentle curve" are index values indicating the easiness of PM deposition in the DPF when the driver indicated by the driver ID drives the vehicle on a gently curved road. The values of the item "driving pattern" and the item "sharp curve" are index values indicating the easiness of PM deposition in the DPF when the driver indicated by the driver ID drives the vehicle on a sharp curved road.

Here, the easiness of PM deposition in the DPF of the present embodiment will be described. The route management server 200 of the present embodiment collects the running history and the PM deposition amount for each driver ID and generates the driving pattern database 210 from the running history and the history of the PM deposition amount.

Then, from the running history and the history of the PM deposition amount, the reference PM deposition amount is calculated in advance for the three items associated with the item "driving pattern."

For example, based on the running history and the PM deposition amount for each driver ID, the route management server 200 sets the average value of the PM deposition amount for each driver ID when running on a predetermined straight section on a road, as the reference value of the PM deposition amount on the straight road. Further, the route management server 200 sets the average value of the PM deposition amount for each driver ID when running on a predetermined gently curved section on a road, as the reference value of the PM deposition amount on the gently curved road. Further, the route management server 200 sets the average value of the PM deposition amount for each driver ID when running on a predetermined sharp curved section on a road, as the reference value of the PM deposition amount on the sharp curved road.

Next, the route management server 200 calculates the ratio of the PM deposition amount on the predetermined straight road to the reference PM deposition amount from the running history and the PM deposition amount for each driver ID. This ratio is an index value indicating the easiness of PM deposition when a driver indicated by each driver ID drives a vehicle on a straight road.

The easiness of PM deposition when running on a gentle curve or a sharp curve is also determined in the same way.

In FIG. 19, in the driving pattern corresponding to the driver ID "1," the value of "straight" is 0.9, the value of "gentle curve" is 1.2, and the value of "sharp curve" is 0.8.

Therefore, it may be understood that when the driver indicated by the driver ID "1" drives the vehicle on a straight road, the PM deposition amount tends to be smaller than the reference value, and when the driver drives the vehicle on a gentle curve or sharp curve, the PM deposition amount tends to be larger than the reference value.

The driving pattern database 210 of the present embodiment may be prepared in advance by, for example, an administrator of the route management system 150 and stored in the route management server 200.

FIG. 20 is a view illustrating an example of the vehicle database. The vehicle database 220 of the present embodiment has, as information items, a vehicle ID and the easiness of PM deposition, which are associated with each other. The value of the item "vehicle ID" indicates an identifier for identifying a vehicle. The item "easiness of PM deposition" indicates the easiness of PM deposition for each vehicle. In the following description, the information including the value of the item "vehicle ID" and the item "easiness of PM deposition" is referred to as vehicle information.

The value of the item "easiness of PM deposition" in the vehicle database 220 may be given in advance based on, for example, the weight of the vehicle or the total displacement amount. Further, in the present embodiment, 1.0 is set as the reference value for item "easiness of PM deposition".

For example, in a case where a vehicle of a specific vehicle type is regarded as a vehicle serving as the reference for "easiness of PM deposition" from the weight of the vehicle, for example, the total displacement amount, the item "easiness of PM deposition" for this vehicle is 1.0.

In FIG. 20, for a vehicle with the vehicle ID "100," the item "easiness of PM deposition" is "1.5." Therefore, it may be understood that the vehicle with the vehicle ID "100" is a vehicle in which PM is more likely to be deposited than the reference vehicle.

The vehicle database 220 of the present embodiment may be prepared in advance by, for example, the administrator of the route management system of the present embodiment and stored in the route management server 200.

FIG. 21 is a view illustrating an example of the shipment database. The shipment database 230 of the present embodiment includes, as information items, a shipment ID, weight, and the easiness of PM deposition. In the shipment database 230, the item "shipment ID" is associated with the other items, and the information including the value of the item "shipment ID" and the values of the other items is referred to as shipment information.

The value of the item "shipment ID" is an identifier for identifying a shipment and is assigned to each shipment. The value of the item "weight" indicates the weight of the shipment indicated by the shipment ID. The item "easiness of PM deposition" indicates the easiness of PM deposition for each shipment.

The value of the item "easiness of PM deposition" in the shipment database 230 may be determined based on the reference weight and the weight of the shipment.

For example, it is assumed that when a shipment with the weight of 10 kg is mounted on a vehicle, the PM deposition amount deposited in the DPF is the reference value and the value of the item "easiness of PM deposition" is 1.0. In this case, a value indicating the radio of the PM deposition amount deposited in the DPF for another shipment on the vehicle to the reference value is the value of the item "easiness of PM deposition" of the another shipment.

In the example of FIG. 21, the easiness of PM deposition for a shipment having a shipment ID of "10" and a weight of "50 kg" is "1.5," and it may be understood that the PM tends to be easily deposited, as compared with a case where the reference shipment is mounted on the vehicle.

For example, when a shipment is loaded on a vehicle, the shipment database 230 may store a shipment ID and a weight. Further, in the present embodiment, for example, when the shipment ID and the weight are stored, the value of the item "easiness of PM deposition" may be calculated from the relationship with the weight of the reference shipment.

FIG. 22 is a view illustrating an example of the congestion database. The congestion database 240 of the present embodiment has, as information items, a section and the easiness of PM deposition, which are associated with each other. In the following description, the information including the value of the item "section" and the item "easiness of PM deposition" is referred to as congestion information.

The value of the item "section" is a value for specifying a section of a road. Typically, in road information provided to, for example, a car navigation device, a road is managed with a plurality of sections. The value of the item "section" indicates these sections. Specifically, the value of the item "section" indicates position information P of a start point and an end point of a section. In FIG. 22, for example, a section "P1, P2" indicates a section where the start point is the point P1 and the end point is the point P2. In addition, the position information may be indicated by latitude and longitude.

The item "easiness of PM deposition" is further associated with three items. The items correlated with the item "easiness of PM deposition" are items indicating the state of traffic congestion on a road, including "no congestion," "light congestion," and "heavy congestion" in the example of FIG. 22. Here, the "no congestion" indicates, for example, a state in which a vehicle can run at a speed equal to or higher than a predetermined speed. The "light congestion" indicates, for example, a state in which a train of vehicles which run at a low speed equal to or less than a predetermined speed or repeat stopping/starting is 1 km or more long or is maintained for 15 minutes or more. The "heavy congestion" indicates, for example, a state in which a train of vehicles which run at a low speed equal to or less than a predetermined speed or repeat stopping/starting is 20 km or more long.

In the present embodiment, the PM deposition amount when a vehicle runs on each section where no congestion occurs is taken as a reference value, and in this case, the value of the item "easiness of deposition of PM" is 1.0. In addition, in the present embodiment, the value of the item "light congestion" indicates the ratio of the PM deposition amount when a vehicle runs on each section where light congestion occurs, to the reference value. Further, in the present embodiment, the value of the item "heavy congestion" indicates the ratio of the PM deposition amount when a vehicle runs on each section where heavy congestion occurs, to the reference value.

In FIG. 22, in the section "P1, P2," the value of the item "easiness of PM deposition" is 1.1 for the light congestion and 1.3 for the heavy congestion.

The congestion database 240 of the present embodiment may be prepared in advance by, for example, the administrator of the route management system 150 of the present embodiment and stored in the route management server 200.

FIG. 23 is a view illustrating an example of the reference deposition amount database. The reference deposition amount database 250 of the present embodiment has, as information items, a section and a reference deposition amount, which are associated with each other. In the following description, the information including the value of the item "section" and the value of the item "reference deposition amount" will be referred to as reference deposition information.

The value of the item "reference deposition amount" indicates the reference value of the PM deposition amount when a vehicle runs on the corresponding section. At this time, it may be preferable that the vehicle running on the corresponding section is a vehicle serving as the reference when the vehicle database 220 is generated. In addition, it may be preferable that no congestion occurs on a road indicated by the section.

The reference deposition amount for each section may be the average value of the PM deposition amount for each section in the running history for every driver collected by the route management server 200.

For example, the reference deposition amount database 250 of the present embodiment may be stored in advance by, for example, the administrator of the route management system 150 of the present embodiment.

Figure 24:
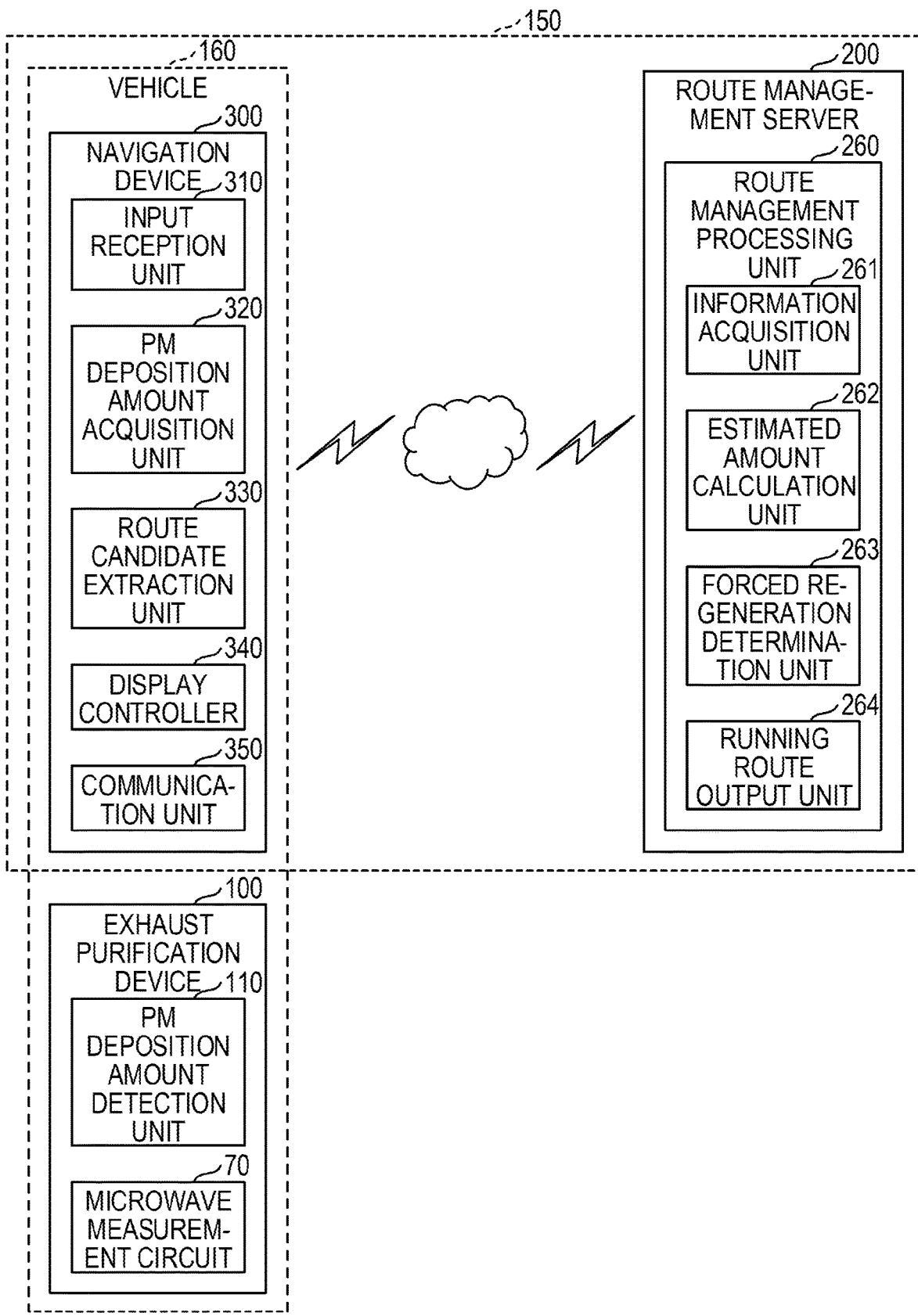
FIG. 24 is a view for explaining the function of each device of the route management system according to the third embodiment.

Next, the function of each device of the route management system 150 of the present embodiment will be described with reference to FIG. 24. FIG. 24 is a view for explaining the function of each device of the route management system.

First, the function of the route management server 200 of the present embodiment will be described. The route management server 200 of the present embodiment has a route management processing unit 260. The route management processing unit 260 is implemented by the arithmetic processing unit 206 of the route management server 200 reading and executing the route management program, for example, from the memory device 205.

The route management processing unit 260 of the present embodiment includes an information acquisition unit 261, an estimated amount calculation unit 262, a forced regeneration determination unit 263, and a running route output unit 264.

The information acquisition unit 261 acquires a variety of information such as a driver ID, a vehicle ID, a candidate running route, and a PM deposition amount transmitted from the navigation device 300.

The estimated amount calculation unit 262 calculates an estimated PM deposition amount, which is an estimated amount of PM deposition when running on the candidate running route, from the variety of information acquired by the information acquisition unit 261. Details of the estimated amount calculation unit 262 of the present embodiment will be described later.

Based on the estimated PM deposition amount calculated by the estimated amount calculation unit 262, the forced regeneration determination unit 263 determines whether or not the forced regeneration is performed when a vehicle runs on a running route targeted for calculation of the estimated PM deposition amount. In the present embodiment, for example, when the estimated PM deposition amount becomes larger than a preset threshold value, it may be determined that the forced regeneration is performed.

Based on the determination result of the forced play determination unit 263, the running route output unit 264 outputs the running route selected as a running route to be presented to the navigation device 300, to the navigation device 300.

Next, the navigation device 300 of the present embodiment will be described. The navigation device 300 of the present embodiment includes an input reception unit 310, a PM deposition amount acquisition unit 320, a route candidate extraction unit 330, a display controller 340, and a communication unit 350.

The input reception unit 310 inputs various kinds of information on the navigation device 300. Specifically, the input reception unit 310 receives an input of a departure point, a destination, and a driver ID. Further, in the present embodiment, for example, when the navigation device 300 is a portable device not installed in the vehicle, the input reception unit 310 also receives an input of a vehicle ID of the vehicle on which the navigation device 300 is mounted.

The PM deposition amount acquisition unit 320 acquires the detected PM deposition amount from the exhaust purification apparatus 100 installed in the vehicle.

The route candidate extraction unit 330 receives an input of a departure point and a destination and extracts a candidate running route from the departure point to the destination. The candidate running route is extracted as a result of making a request to acquire a candidate running route, for example, to a server in which road information existing outside the route management system 150 is stored.

The display controller 340 causes, for example, the display of the navigation device 300 to display a running route, map information and the like. The communication unit 350 is responsible for communication between the navigation device 300 and the route management server 200.

Next, the exhaust purification apparatus 100 will be described. The exhaust purification apparatus 100 is installed in the automobile 160 and cleans the PM deposited in the DPF of the automobile 160. The exhaust purification apparatus 100 of the present embodiment has a PM deposition amount detection unit 140 including the microwave measurement circuit 70. The PM deposition amount detection unit 140 detects the PM deposition amount deposited in the DPF.

In the example of FIG. 24, the PM deposition amount detection unit 140 is installed inside the exhaust purification apparatus 100. However, the present disclosure is not limited thereto. The PM deposition amount detection unit 140 may be installed independently from the exhaust purification apparatus 100.

Figure 25:
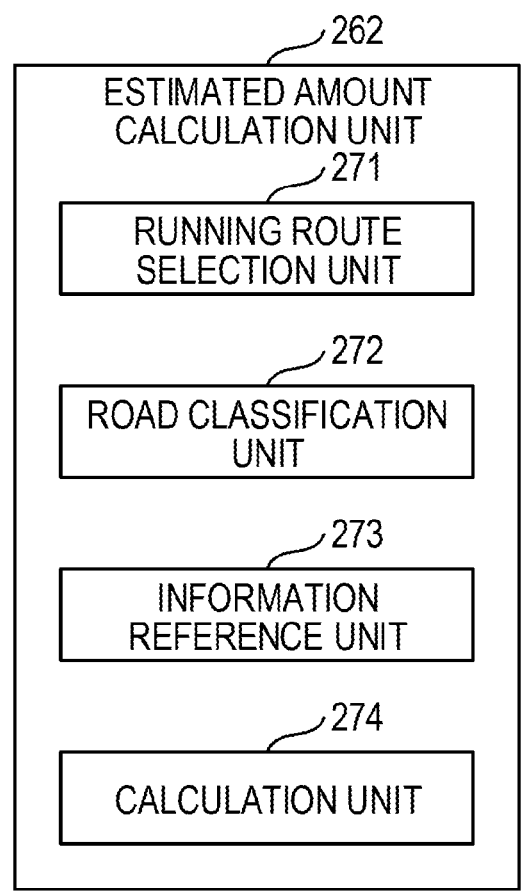
FIG. 25 is a view for explaining the function of an estimated amount calculating circuit.

Next, the estimated amount calculation unit 262 of the route management processing unit 260 of the present embodiment will be described with reference to FIG. 25. FIG. 25 is a view for explaining the function of the estimated amount calculation unit.

The estimated amount calculation unit 262 of the present embodiment includes a running route selection unit 271, a road classification unit 272, an information reference unit 273 and a calculation unit 274.

The running route selection unit 271 selects a running route targeted for calculation of the estimated PM deposition amount from the candidates running routes acquired from the navigation device 300.

The road classification unit 272 classifies sections of a road included in the selected running route into a straight road, a gentle curve, and a sharp curve. In other words, the road classification unit 272 classifies sections of a road included in the selected running route to correspond to the items indicating the shapes of the road associated with the item "driving pattern" in the driving pattern database 210.

The information reference unit 273 refers to a variety of information acquired from the navigation device 300 by the information acquisition unit 261 and each database of the route management server 200.

The calculation unit 274 calculates the estimated PM deposition amount for each of the sections classified by the road classification unit 272 in the selected running route. Details of the calculation of the estimated PM deposition amount by the calculation unit 274 will be described later.

Hereinafter, the operation of each device of the route management system 150 of the present embodiment will be described with reference to FIGS. 26 to 28. The processes of FIGS. 26 to 28 to be described below are performed, for example, before a driver starts driving the automobile 160.

Figure 26:
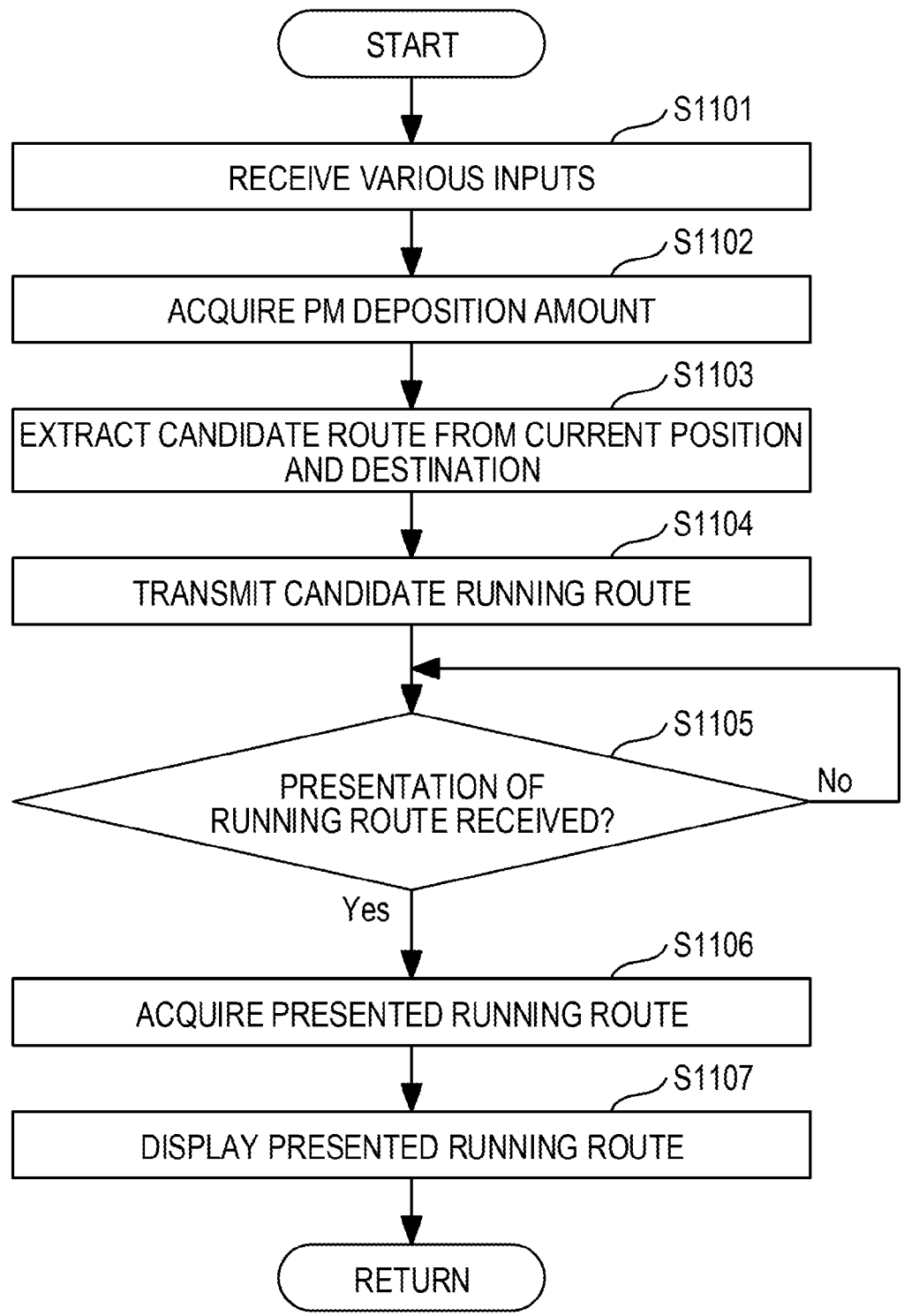
FIG. 26 is a flowchart for explaining the operation of a navigation device.

FIG. 26 is a flowchart for explaining the operation of the navigation device.

The input reception unit 310 of the navigation device 300 of the present embodiment receives various inputs (step S1101). Specifically, the input reception unit 310 receives an input of a driver ID, a departure point, a destination, etc. input by a driver of the automobile 160 on which the navigation device 300 is mounted. Further, for example, upon receiving the input of the driver ID, the input reception unit 310 may acquire a vehicle ID of the automobile 160 and acquire a shipment ID associated with the vehicle ID in the shipment database 230.

Subsequently, the PM deposition amount acquisition unit 320 of the navigation device 300 acquires the PM deposition amount detected by the PM deposition amount detection unit 140 of the exhaust purification apparatus 100 (step S1102).

Subsequently, the route candidate extraction unit 330 of the navigation device 300 extracts a candidate running route from the departure point and the destination (step S1103). The communication unit 350 of the navigation device 300 may transmit the information on the departure point and, for example, the destination to an external server and receive a candidate running route acquired by the external server.

Next, the communication unit 350 of the navigation device 300 transmits the extracted candidate running route to the route management server 200 (step S1104).

Subsequently, the communication unit 350 of the navigation device 300 determines whether or not the presentation of the recommended running route has been received from the route management server 200 (step S1105).

When it is determined that the presentation of the running route has not been received ("No" in step S1105), the navigation device 300 waits until receiving the presentation of the running route.

When it is determined that the presentation of the running route has been received ("Yes" in step S1105), the navigation device 300 acquires the presentation of the running route (step S1106), the display controller 340 of the navigation device 300 displays the running route on the display (step S1107), and then, the process is ended.

Next, the process by the route management server 200 of the present embodiment will be described with reference to FIG. 27. FIG. 27 is a flowchart for explaining the operation of the route management server.

The route management server 200 of the present embodiment determines whether or not a variety of information has been acquired from the navigation device 300 by the information acquisition unit 261 of the route management processing unit 260 (step S1201). Here, the variety of information acquired by the information acquisition unit 261 is information including a driver ID, a vehicle ID, a shipment ID, a PM deposition amount and a candidate running route.

When it is determined that the variety of information has not been acquired ("No" in step S1201), the route management processing unit 260 waits until acquiring the above-described variety of information.

When it is determined that the variety of information has been acquired ("Yes" in step S1201), the information acquisition unit 261 of the route management processing unit 260 refers to the driving pattern database 210 to acquire driving pattern information corresponding to the acquired driver ID (step S1202).

Next, the information acquisition unit 261 refers to the vehicle database 220 to acquire the vehicle information corresponding to the acquired vehicle ID (step S1203). Subsequently, the information acquisition unit 261 refers to the shipment database 230 to acquire the shipment information corresponding to the acquired shipment ID (step S1204).

Next, the information acquisition unit 261 refers to the congestion database 240 to acquire the congestion information corresponding to the running route from the candidate running route (step S1205). Specifically, the information acquisition unit 261 may divide a road indicated on the acquired candidate running route into sections, and may acquire the congestion information for each corresponding section in the congestion database 240.

Subsequently, the estimated amount calculation unit 262 of the route management processing unit 260 selects one from the acquired candidate running routes (step S1206).

Subsequently, the route management processing unit 260 uses the driving pattern information, the vehicle information, the shipment information, and the congestion information acquired in step S1202 to step S1205 to calculate the estimated PM deposition amount of the candidate running route selected by the estimated amount calculation unit 262 (step S1207). Details of the process of step S1207 will be described later.

Subsequently, the forced regeneration determination unit 263 of the route management processing unit 260 determines whether or not the cleaning (forced regeneration) is performed before arriving at the destination when running on the selected candidate running route (step S1208). In other words, the forced regeneration determination unit 263 of the present embodiment determines whether or not the calculated estimated PM deposition amount is less than a preset threshold value. In addition, the threshold value serving as the criterion for determination may be held in the forced regeneration determination unit 263. This threshold value may be predetermined for each vehicle or may be acquired by the navigation device 300 together with the vehicle ID and transmitted to the route management server 200.

When it is determined that the forced regeneration is performed ("No" in step S1208), the estimated amount calculation unit 262 selects the next candidate running route (step S1209), and the process returns to step S1207.

When it is determined that the forced regeneration is not performed ("Yes" in step S1208), the route management processing unit 260 determines whether or not the process of step S1207 and the subsequent step has been performed for all the candidate running routes acquired from the navigation device 300 (step S1210).

When it is determined that all the candidate running routes have not been processed ("No" in step S1210), the route management processing unit 260 proceeds to step S1209.

When it is determined that all the candidate running routes have been processed ("Yes" in step S1210), the route management processing unit 260 determines whether or not there is a candidate running route for which the forced regeneration is not performed (step S1211).

When it is determined that there is a candidate running route ("Yes" in step S1211), the running route output unit 264 transmits the corresponding candidate running route to the navigation device 300 as a candidate running route to avoid the forced regeneration (step S1212), and the process is ended.

When it is determined that there is no candidate running route ("No" in step S1211), the running route output unit 264 transmits a notification indicating that there is no corresponding candidate running route to the navigation device 300 (step S1213), and the process is ended.

Figure 27:
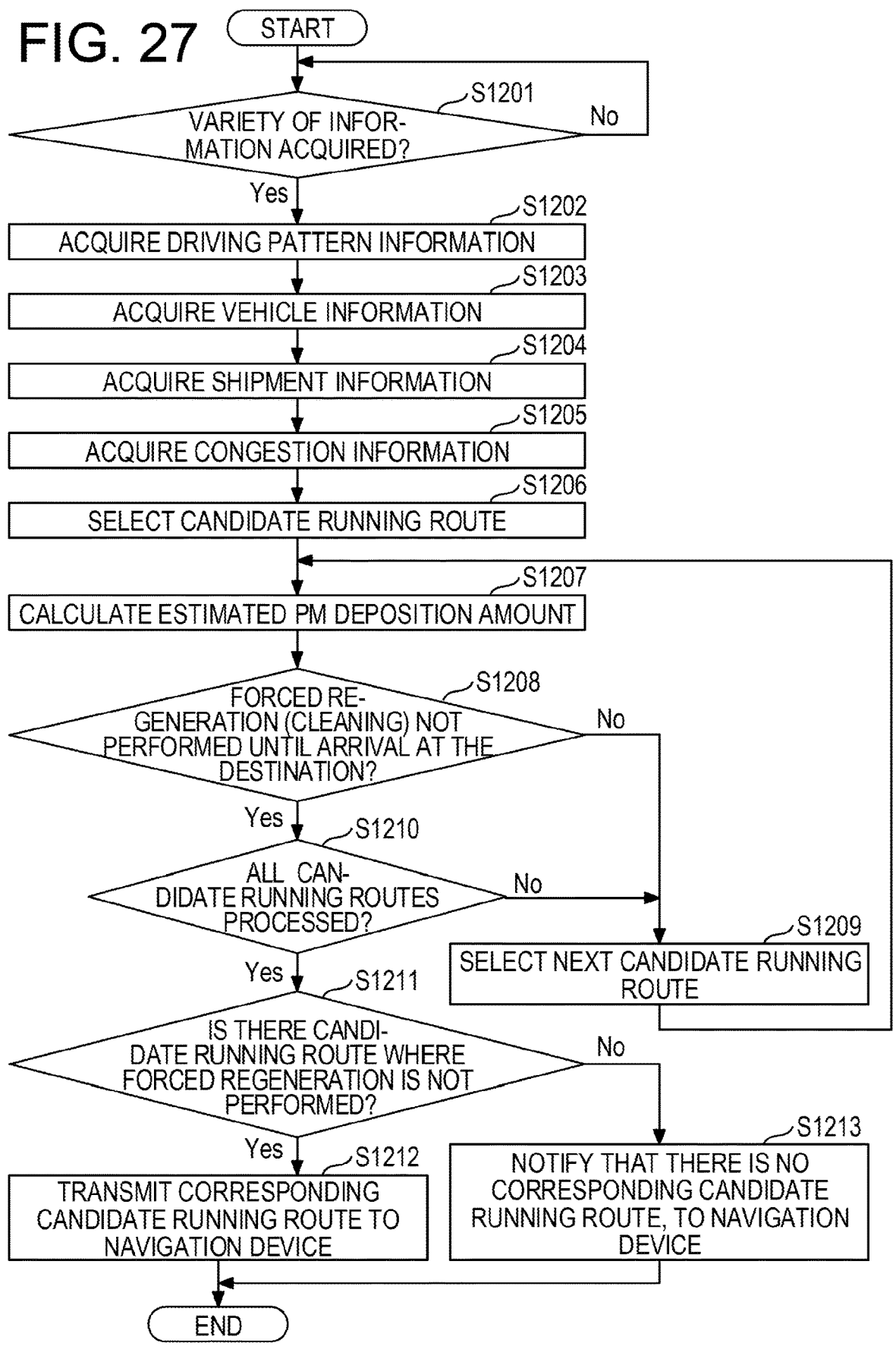
FIG. 27 is a flowchart for explaining the operation of a route management server.
Figure 28:
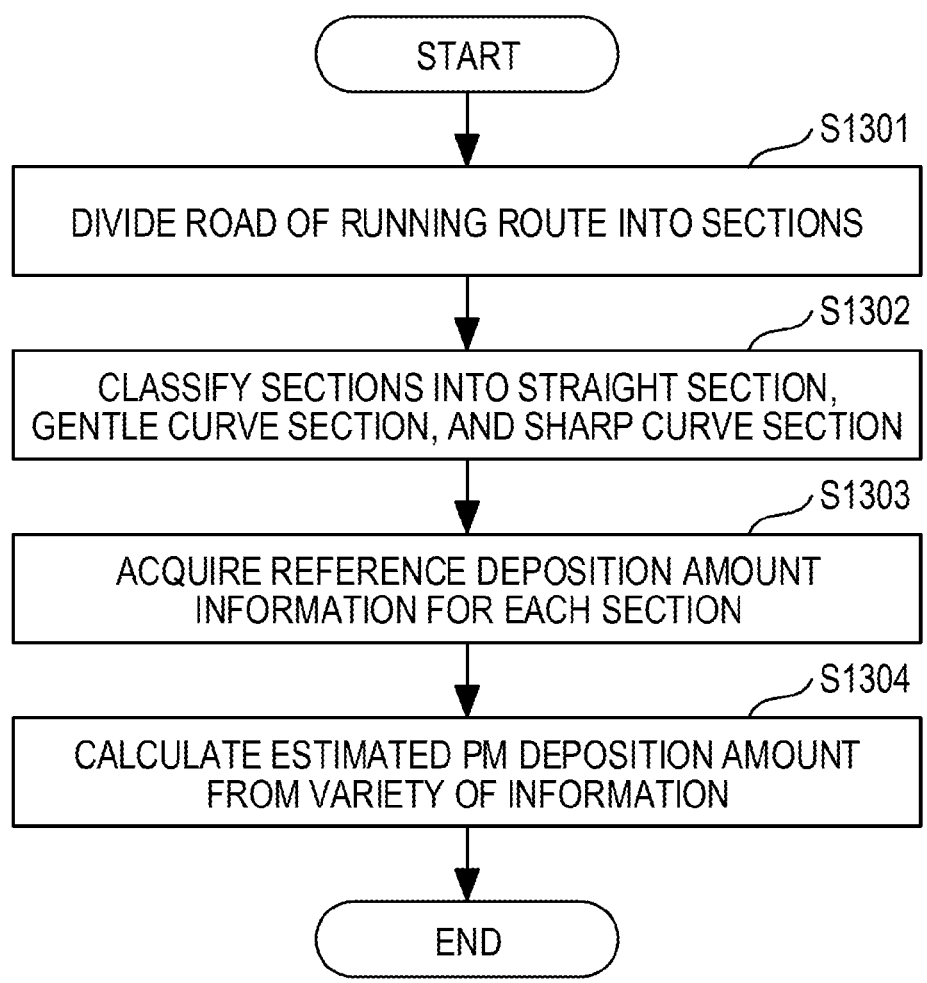
FIG. 28 is a flowchart for explaining the process performed by the estimated amount calculating circuit.

In the example of FIG. 27, the route management server 200 selects a running route for which no forced regeneration is performed from a candidate running route, and presents the selected running route to the navigation device 300. However, the present disclosure is not limited thereto. For example, when there is no running route for which the forced regeneration is not performed, the route management server 200 may present a running route having the smallest number of times of forced regeneration to the navigation device 300.

Next, the process performed by the estimated amount calculation unit 262 of the present embodiment will be described with reference to FIG. 28. FIG. 28 is a flowchart for explaining the process performed by the estimated amount calculation unit. FIG. 28 illustrates details of the process of step S1207 in FIG. 27.

The estimated amount calculation unit 262 of the present embodiment divides a road included in the selected running route into sections (step S1301). Subsequently, the estimated amount calculation unit 262 classifies the roads of the respective sections into a straight road, a gentle curve, and a sharp curve (step S1302). In other words, the estimated amount calculation unit 262 classifies the roads of the sections into the shapes of a road associated with the driving pattern.

Subsequently, the estimated amount calculation unit 262 refers to the reference deposition amount database 250 to acquire the reference value of the PM deposition amount for each section (step S1303).

Subsequently, the estimated amount calculation unit 262 calculates the estimated PM deposition amount X according to the following equation 1 (step S1304).

[Eq. 1]

$$X = \int_{P_1}^{P_2} f(\text{section}) \cdot a(\text{driverID}) \cdot b(\text{vehicleID}) \cdot c(\text{shipmentID}) \cdot d(\text{section}) + \text{PM deposition amount} \quad (1)$$

In Equation 1, P1 is the position information of a departure point, and P2 is the position information of a destination. f(section) indicates the reference value of the PM deposition amount for each section. The "a(driverID)" of Eq. 1 indicates the driving pattern information including the driver ID, specifically, a value of the driving pattern associated with the driver ID and corresponding to the shape of a road in a section. The "b(vehicleID)" of Eq. 1 is the vehicle information including the vehicle ID and specifically indicates the value of the easiness of PM deposition associated with the vehicle ID.

The "c(shipmentID)" of Eq. 1 indicates the shipment information including the shipment ID, specifically, the value of the easiness of PM deposition associated with the shipment ID. The "d(section)" of Eq. 1 indicates the congestion information for each section, specifically, the value of the easiness of PM deposition associated with the type of congestion for each section.

In other words, the estimated amount calculation unit 262 of the present embodiment obtains, for each section between the departure point and the destination, the product of a value as an index of the easiness of PM deposition associated with various items affecting how the PM is deposited and the reference value of the PM deposition amount for each section calculated from the past history.

This product is the PM deposition amount estimated to increase as the automobile 160 runs on the running route. In the following description, the PM deposition amount estimated to increase will be referred to as an estimated increase PM deposition amount. Then, the estimated amount calculation unit 262 sets the sum of the estimated increase PM deposition amount and the PM deposition amount already deposited in the automobile 160 as the estimated PM deposition amount estimated to be deposited when arriving at the destination.

In the present embodiment, a candidate running route in which the estimated PM deposition amount is less than the threshold value is taken as a running route that may reach the destination without the forced regeneration.

Hereinafter, the process performed by the route management server 200 of the present embodiment will be further described with reference to FIGS. 29 to 32.

Figure 29:
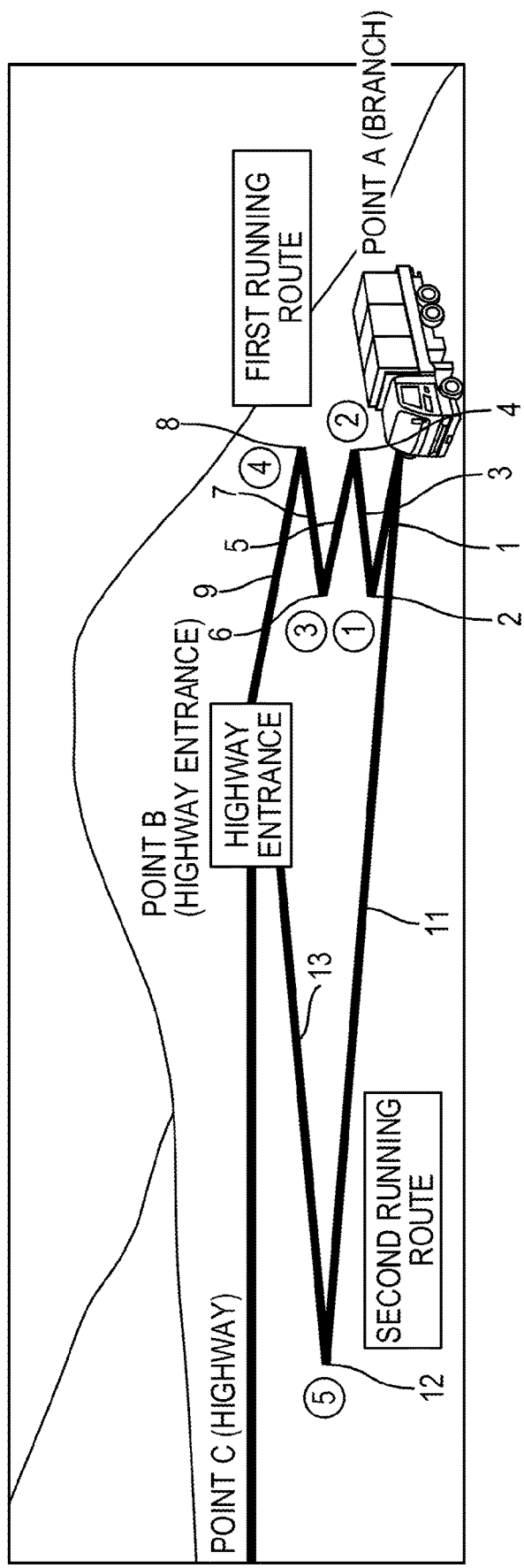
FIG. 29 is a view for explaining an example of a traveling route.

FIG. 29 is a view for explaining an example of a running route. FIG. 29 illustrates running routes in which the departure point is a point A and the destination is a point B. In the example of FIG. 29, it is assumed that a first running route and a second running route are candidate running routes in which the departure point is the point A and the destination is the point B.

The road of the first running route includes a section 1 from the point A to a curve 1, a section 2 from the start point of the curve 1 to the end point of the curve 1, a section 3 from the end point of the curve 1 to the start point of a curve 2, and a section 4 from the start point of the curve 2 to the end point of the curve 2. Further, the road of the first running route includes a section 5 from the end point of the curve 2 to the start point of a curve 3, a section 6 from the start point of the curve 3 to the end point of the curve 3, a section 7 from the end point of the curve 3 to the start point of a curve 4, a section 8 from the start point of the curve 4 to the end point of the curve 4, and a section 9 from the end point of the curve 4 to the point B. That is, the first running route includes the nine sections.

The road of the second running route includes a section 11 from the point A to the start point of a curve 5, a section 12 from the start point of the curve 5 to the end point of the curve 5, and a section 13 from the end point of the curve 5 to the point B. That is, the second running route includes the three sections.

In this example, it is assumed that the curves 1 and 2 of the first running route are gentle, and the curves 3 and 4 are sharp. Further, it is assumed that the road in a section between the curves is straight. It is assumed that the curve 5 of the second running route is gentle and the roads of sections other than the curve are straight.

Further, it is assumed that the automobile 160 running from the point A to the point B has the vehicle ID "101," and the driver of the automobile 160 has the driver ID "1." Further, it is assumed that a shipment with the shipment ID "10" is loaded on the automobile 160.

Further, in this example, it is assumed that light congestion is occurring in the first running route, and heavy congestion is occurring in the second running route.

In this example, since the road of the section 1 of the first running route is straight, the estimated amount calculation unit 262 acquires a value "0.9" indicating the easiness of PM deposition as the driving pattern information of the section 1 (see FIG. 19). In addition, the road in the section 2 is a gentle curve. Therefore, the estimated amount calculation unit 262 acquires a value "1.2" indicating the easiness of PM deposition as the driving pattern information of the section 2.

Further, the estimated amount calculation unit 262 acquires a value "0.7" indicating the easiness of PM deposition as the vehicle information in the sections 1 to 9 (see FIG. 20). In addition, a shipment with the shipment ID "10" is loaded on the automobile 160. Therefore, the estimated amount calculation unit 262 acquires a value "1.5" indicating the easiness of PM deposition as the shipment information in the sections 1 to 9 (see FIG. 21).

Further, the estimated amount calculation unit 262 acquires a value indicating the easiness of PM deposition depending on the state of congestion occurring in each section, as the congestion information in the sections 1 to 9 of the first running route.

Figure 30:
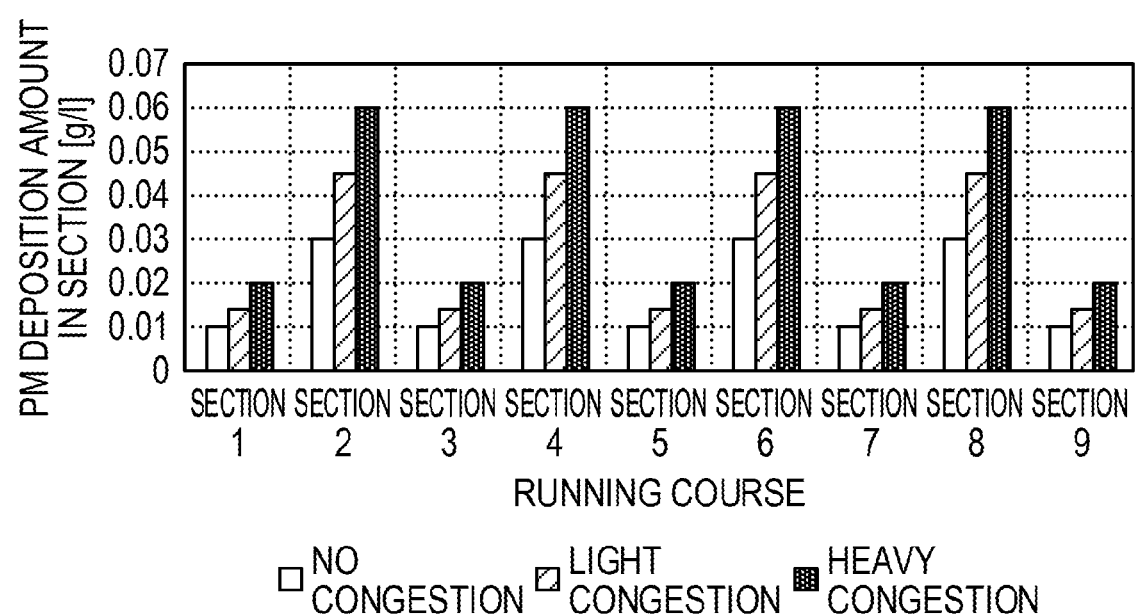
FIG. 30 is a first view illustrating an example of congestion information.

An example of the congestion information in the sections 1 to 9 will be described with reference to FIG. 30. FIG. 30 is a first view illustrating an example of the congestion information.

FIG. 30 represents PM deposition amounts corresponding to the three congestion states, namely, no congestion, light congestion, and heavy congestion, for each of the sections 1 to 9 of the first running route. For example, the values represented in FIG. 30 are records obtained when the driver of the driver ID "1" drove the automobile 160 of the vehicle ID "101" on the first running route in the past, and may be held in the congestion database 240. Further, each of the values represented in FIG. 30 may be, for example, an average value obtained from a plurality of vehicles ran on the first running route in the past.

The estimated amount calculation unit 262 of the present embodiment acquires a "value indicating the easiness of PM deposition" for each section, which is calculated based on the PM deposition amount in each section and the reference value of the deposition amount in each section.

Then, the estimated amount calculation unit 262 of the present embodiment refers to the reference deposition amount database 250 to obtain the estimated increase PM deposition amount which is the product of the reference value of the PM deposition amount for each section and the "value indicating the easiness of PM deposition" for each section acquired as information of each section. Then, the estimated amount calculation unit 262 sets the sum of the total estimated increase PM deposition amount for each section and the PM deposition amount detected in the navigation device 300 as the estimated PM deposition amount when running on the first running route.

Figure 31:
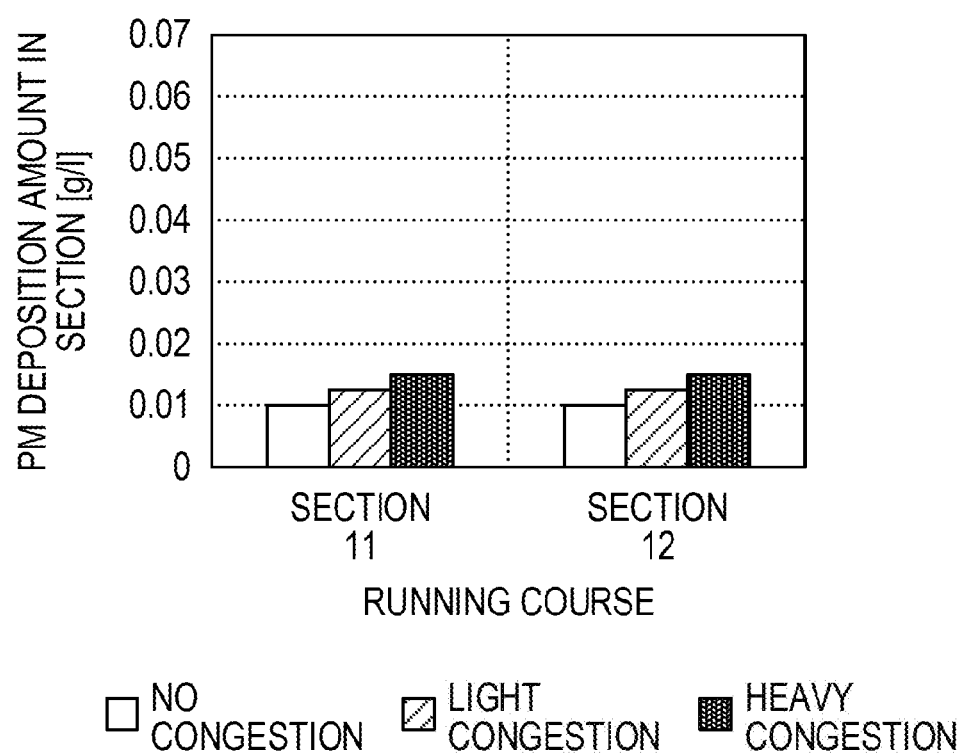
FIG. 31 is a second view illustrating an example of congestion information.

Next, an example of the congestion information in the sections 1 to 3 will be described with reference to FIG. 31. FIG. 31 is a second view illustrating an example of the congestion information.

FIG. 31 represents PM deposition amounts corresponding to the three congestion states, namely, no congestion, light congestion, and heavy congestion, for each of the sections 1 to 3 of the second running route. As in FIG. 30, the values represented in FIG. 31 are records obtained when the driver drove the automobile 60 of the vehicle ID "101" on the second running route in the past, and may be held in the congestion database 240. Further, each of the values represented in FIG. 31 may be, for example, an average value obtained from a plurality of vehicles ran on the second running route in the past.

As in the case of the first running route, the estimated amount calculation unit 262 obtains the estimated increase PM deposition amount in the sections 1 to 3 and sets the sum of the total estimated increase PM deposition amount and the PM deposition amount detected in the navigation device 300 as the estimated PM deposition amount when running on the second running route.

As described above, in the present embodiment, the estimated PM deposition amount for each running route is calculated. Next, determination by the forced regeneration determination unit 263 will be described with reference to FIG. 32.

Figure 32:
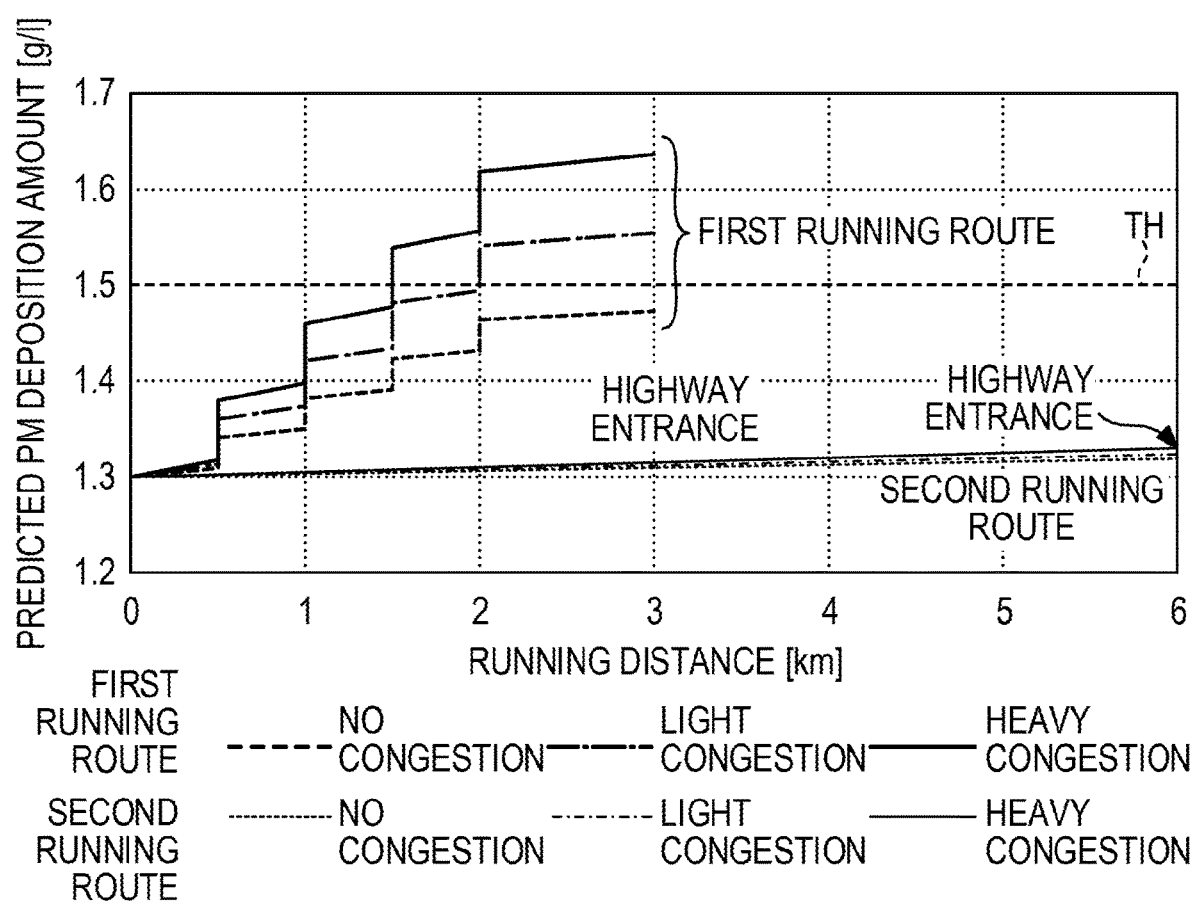
FIG. 32 is a view for explaining the determination made by a forced regeneration determination circuit.

FIG. 32 is a view for explaining the determination by the forced regeneration determination unit. FIG. 32 illustrates a graph representing the estimated PM deposition amount for each congestion state for each of the first running route and the second running route.

In FIG. 32, a threshold value TH for determining whether or not the forced regeneration is performed is set to 1.5 [g/l]. Further, in FIG. 32, the PM deposition amount acquired from the navigation device 300 is set to 1.3 [g/l].

In FIG. 32, in the first running route, for the state of no congestion, the estimated PM deposition amount when arriving at the destination is less than the threshold value TH. In addition, in the first running route, for the state of light congestion or heavy congestion, the estimated PM deposition amount when arriving at the destination is equal to or larger than the threshold value TH.

In contrast, in the second running route, the estimated PM deposition amount does not exceed the threshold value, regardless of the state of congestion. However, the second running route is longer than the first running route and is expected to reach the destination later than the first running route.

The following description will be described by assuming that light congestion is occurring in the first running route and heavy congestion is occurring in the second running route.

In this case, in the first running route, since the estimated PM deposition amount is equal to or larger than the threshold value TH, the forced regeneration determination unit 263 excludes the first running route, which is a running route where the forced regeneration is performed, from options. In the second running route, since the estimated PM deposition amount is less than the threshold value TH, the forced regeneration determination unit 263 presents the second running route to the navigation device 300 as a running route where the forced regeneration is not performed.

Therefore, the running route output unit 264 of the route management server 200 outputs the second running route to the navigation device 300 as a running route for improving fuel efficiency. Upon receiving the output, the navigation device 300 displays information indicating the running route for improving the fuel efficiency and the second running route.

In addition, for example, a case where no congestion is occurring in the first running route will also be described. In this case, even in the first running route, the estimated PM deposition amount is less than the threshold value TH when arriving at the destination.

Therefore, the running route output unit 264 outputs both the first running route and the second running route to the navigation device 300 as running routes for improving the fuel efficiency.

In this case, the running route output unit 264 may output, for example, information indicating that the second running route is more improved in the fuel efficiency over the first running route, and the first running route has a shorter running distance than the second running route, to the navigation device 300 along with the running routes.

Upon receiving the output, the navigation device 300 displays the first running route and the second running route as running routes for improving the fuel efficiency. At this time, the navigation device 300 may display each of the running routes in an order of an increasing running distance of a running route or in an order of an increasing PM deposition amount. In addition, the navigation device 300 may receive a sorting operation for changing the order of displaying the running routes described above.

As described above, according to the present embodiment, when selecting a running route, the estimated PM deposition amount until arriving at the destination is calculated, by calculating the estimated increase PM deposition amount deposited by running on the running route, and adding the calculated estimated increase PM deposition amount to the PM deposition amount detected from a vehicle. Then, in the present embodiment, a running route for reducing the number of times of cleaning is selected and presented based on the calculated estimated PM deposition amount.

Therefore, according to the present embodiment, it is possible to reduce the number of times of cleaning of the deposited particulate matter.

Furthermore, in the present embodiment, when calculating the estimated increase PM deposition amount, a value indicating the easiness of PM deposition is assigned to each of the various parameters affecting the PM deposition, such as a driver, a vehicle, a shipment, the shape of a road, and the state of congestion, and the estimated increase PM deposition amount is calculated based on the value. In other words, in the present embodiment, weighting is performed on the various parameters affecting the PM deposition, and the estimated increase PM deposition amount is calculated based on the weight and the reference value of PM deposition amount calculated from the running history collected in the past.

Therefore, according to the present embodiment, since the accuracy of the estimation of the PM deposition amount that increases when running on the running route is improved, the accuracy of the determination as to whether or not cleaning is performed may also be improved, and a running route for reducing the number of times of cleaning may be presented.

In the present embodiment, the databases illustrated in FIGS. 19 to 22 have been described as an example of the parameters affecting the PM deposition. However, the kinds of the parameters are not limited thereto. For example, the parameters may include, for example, weather information and information indicating the state of a road surface, and may be any parameters as long as the parameters are related to the cause of the PM deposition.

In addition, in the present embodiment, the navigation device 300 acquires candidate running routes by transmitting the departure point and the destination to an external server. However, the present disclosure is not limited thereto. The route management server 200 of the present embodiment may have a navigation function to receive an input of a departure point and a destination and extract candidate running routes. In that case, the navigation device 300 may transmit the information of the departure point and the destination to the route management server 200.

Further, the automobile 160 described above is equipped with a diesel engine. However, the present disclosure is not limited thereto. The automobile 160 may be a vehicle equipped with an engine other than the diesel engine.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A microwave irradiation device comprising:
a housing configured to accommodate an object to be heated;
a plurality of microwave resonators configured to be installed around the housing;
a microwave conductor configured to couple the plurality of microwave resonators;
a microwave generator configured to generate microwaves having different frequencies; and
a microwave measurement circuit configured to couple to the housing or to the microwave conductor,
wherein each of the microwave resonators resonates a microwave having a resonance frequency of the microwave resonator generated in the microwave generator and irradiates the resonated microwave to the object placed in the housing, and
one microwave resonator and another microwave resonator among the plurality of microwave resonators have different resonance frequencies,
wherein the microwave irradiation device further includes
a controller configured to control the frequency of the microwave generated in the microwave generator; and
a measuring instrument configured to measure the temperature of the object,
wherein the controller causes the microwave generator to generate a microwave having a frequency at which the microwave becomes strong at a portion where the temperature of the object is low, based on the temperature of the object measured by the measuring instrument.

2. The microwave irradiation device according to claim 1, wherein the measuring instrument is a thermometer.

3. The microwave irradiation device according to claim 1, wherein the microwave generator includes a semiconductor device formed of a nitride semiconductor.

4. The microwave irradiation device according to claim 1, wherein the frequency of the microwave is from 2.4 GHz to 3.0 GHz.

5. An exhaust purification apparatus comprising:
a microwave irradiation device;
a fine particle collection filter configured to collect fine particles contained in an exhaust gas, the fine particle collection filter serving as an object to be heated;
a housing including a housing body covering the fine particle collection filter, and an inlet and an outlet of the exhaust gas coupled to the housing body; and
a controller,
wherein the microwave irradiation device includes:
a housing configured to accommodate an object to be heated;
a plurality of microwave resonators configured to be installed around the housing;
a microwave conductor configured to couple the plurality of microwave resonators;
a microwave generator configured to generate microwaves having different frequencies; and
a microwave measurement circuit configured to couple to the housing or to the microwave conductor,
wherein each of the microwave resonators resonates a microwave having a resonance frequency of the microwave resonator generated in the microwave generator and irradiates the resonated microwave to the object placed in the housing, and
one microwave resonator and another microwave resonator among the plurality of microwave resonators have different resonance frequencies,
wherein a microwave is irradiated from the microwave irradiation device onto the fine particle collection filter.

6. The exhaust purification apparatus according to claim 5, wherein the controller determines whether or not a predetermined amount or more of soot is deposited in the fine particle collection filter, based on the intensity of the microwave measured by the microwave measurement circuit.

7. The exhaust purification apparatus according to claim 5, wherein the controller determines whether or not soot deposited in the fine particle collection filter has been removed, based on the intensity of the microwave measured by the microwave measurement circuit.

8. The exhaust purification apparatus according to claim 5, wherein a thermometer is installed in the fine particle collection filter, and
the controller determines whether to regenerate the fine particle collection filter or whether or not the regeneration of the fine particle collection filter has been ended, based on the temperature measured by the thermometer and the intensity of the microwave measured by the microwave measurement circuit.

9. The exhaust purification apparatus according to claim 8, wherein the controller includes a table representing a relationship between the temperature measured by the thermometer and the intensity of the microwave measured by the microwave measurement circuit, which are used to determine the regeneration of the fine particle collection filter.

10. An automobile comprising an exhaust purification apparatus,
wherein the exhaust purification apparatus includes:
a microwave irradiation device;
a fine particle collection filter configured to collect fine particles contained in an exhaust gas, the fine particle collection filter serving as an object to be heated;
a housing including a housing body covering the fine particle collection filter, and an inlet and an outlet of the exhaust gas coupled to the housing body; and a controller,
wherein the microwave irradiation device includes:
a housing configured to accommodate an object to be heated;
a plurality of microwave resonators configured to be installed around the housing;
a microwave conductor configured to couple the plurality of microwave resonators;
a microwave generator configured to generate microwaves having different frequencies; and
a microwave measurement circuit configured to couple to the housing or to the microwave conductor,
wherein each of the microwave resonators resonates a microwave having a resonance frequency of the microwave resonator generated in the microwave generator and irradiates the resonated microwave to the object placed in the housing, and
one microwave resonator and another microwave resonator among the plurality of microwave resonators have different resonance frequencies,
wherein a microwave is irradiated from the microwave irradiation device onto the fine particle collection filter.

11. A management system comprising:
an automobile including an exhaust purification apparatus; and
a radio base station configured to perform information radio communication with the automobile,
wherein the exhaust purification apparatus includes:
a microwave irradiation device;
a fine particle collection filter configured to collect fine particles contained in an exhaust gas, the fine particle collection filter serving as an object to be heated;
a housing including a housing body covering the fine particle collection filter, and an inlet and an outlet of the exhaust gas coupled to the housing body; and
a controller,
wherein the microwave irradiation device includes:
a housing configured to accommodate an object to be heated;
a plurality of microwave resonators configured to be installed around the housing;
a microwave conductor configured to couple the plurality of microwave resonators;
a microwave generator configured to generate microwaves having different frequencies; and
a microwave measurement circuit configured to couple to the housing or to the microwave conductor,
wherein each of the microwave resonators resonates a microwave having a resonance frequency of the microwave resonator generated in the microwave generator and irradiates the resonated microwave to the object placed in the housing, and
one microwave resonator and another microwave resonator among the plurality of microwave resonators have different resonance frequencies,
wherein a microwave is irradiated from the microwave irradiation device onto the fine particle collection filter.

12. The management system according to claim 11, wherein the system includes;
a navigation device mounted on the automobile; and
a server configured to communicate with the radio base station,
wherein the server includes:
an estimated amount calculation circuit configured to calculate an estimated amount of exhaust fine particles collected in a fine particle collection filter disposed on an exhaust passage of an engine of the automobile for each candidate running route acquired from the navigation device when the automobile runs on the running route and arrives at a destination; and
a display configured to display a running route with the minimum number of times of forced regeneration of the fine particle collection filter on the navigation device, based on the estimated amount of exhaust fine particles.

* * * * *